(12) United States Patent
Takahashi

(10) Patent No.: US 8,960,034 B2
(45) Date of Patent: *Feb. 24, 2015

(54) VEHICLE DRIVE DEVICE

(75) Inventor: Akinori Takahashi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/983,990

(22) PCT Filed: Mar. 23, 2011

(86) PCT No.: PCT/JP2011/056998
§ 371 (c)(1),
(2), (4) Date: Aug. 6, 2013

(87) PCT Pub. No.: WO2012/127655
PCT Pub. Date: Sep. 27, 2012

(65) Prior Publication Data
US 2014/0007740 A1      Jan. 9, 2014

(51) Int. Cl.
*F16H 3/08*     (2006.01)
*B60K 6/365*    (2007.10)
(Continued)

(52) U.S. Cl.
CPC .............. *F16H 37/042* (2013.01); *B60K 6/445* (2013.01); *B60K 17/344* (2013.01); *B60K 23/08* (2013.01); *B60W 20/108* (2013.01); *B60K 6/365* (2013.01); *B60W 10/06* (2013.01); *B60W 10/08* (2013.01); *B60W 10/14* (2013.01); *B60W 30/19* (2013.01);
(Continued)

(58) Field of Classification Search
CPC ................... F16H 37/04; F16H 37/042; F16H 203/0866F16H 206/0422; F16H 2200/0034; F16H ; 2200/2005; F16H 2200/2035; F16H 3/54; B60K 17/344; B60K 23/08; B60K 6/365; B60K 6/445
USPC ........... 74/665 A, 664, 665 R, 373, 650, 335; 475/5, 302, 303; 477/5, 6, 8, 13, 15
See application file for complete search history.

(56) References Cited

U.S. PATENT DOCUMENTS 5,700,222 A * 12/1997 Bowen ........................ 475/204
6,056,666 A *  5/2000 Williams ...................... 475/320
(Continued)

FOREIGN PATENT DOCUMENTS

JP       A-S60-127232       8/1985
JP       A-H05-044832       2/1993
(Continued)

*Primary Examiner* — Ha D Ho
*Assistant Examiner* — Jude Agendia
(74) *Attorney, Agent, or Firm* — Oliff PLC

(57) ABSTRACT

In a vehicle drive device, a response to a range change request, during which the drive wheels are rotated in a low or high range, can be smoothly and quickly completed without using a synchronous engaging mechanism. When the range change is requested when the drive wheels are rotated in the low range or in the high range, the control devices disengage a clutch sleeve from a currently engaged gear piece so as to establish a neutral range, and control an output rotational speed of the motor generator such that a difference between an input rotational speed and an output rotational speed of the transmission mechanism is set to be zero, or be equal to or less than a predetermined value. After that, the control devices cause a connection processor to slide the clutch sleeve to be connected to a connection target gear piece.

7 Claims, 13 Drawing Sheets

(51) Int. Cl.
*F16H 37/04* (2006.01)
*B60K 6/445* (2007.10)
*B60K 17/344* (2006.01)
*B60K 23/08* (2006.01)
*B60W 20/00* (2006.01)
*B60W 10/06* (2006.01)
*B60W 10/08* (2006.01)
*B60W 10/14* (2012.01)
*B60W 30/19* (2012.01)
*F16H 61/04* (2006.01)
*F16H 3/54* (2006.01)
*F16H 37/08* (2006.01)

(52) U.S. Cl.
CPC . *B60K 2023/0858* (2013.01); *F16H 2061/0422* (2013.01); *Y02T 10/6286* (2013.01); *Y02T 10/6239* (2013.01); *Y02T 10/6265* (2013.01); *Y10S 903/902* (2013.01); *F16H 3/54* (2013.01); *F16H 2037/0866* (2013.01); *F16H 2200/0034* (2013.01); *F16H 2200/2005* (2013.01); *F16H 2200/2035* (2013.01)
USPC ................................. 74/373; 475/5; 903/902

(56) References Cited

U.S. PATENT DOCUMENTS

| | | | |
|---|---|---|---|
| 6,464,612 B2 * | 10/2002 | Frost | 475/288 |
| 6,601,668 B2 | 8/2003 | Kitai et al. | |
| 8,257,214 B2 * | 9/2012 | Knoblauch | 475/5 |
| 8,740,745 B2 * | 6/2014 | Murayama | 477/8 |
| 2007/0272046 A1 | 11/2007 | Kawamoto et al. | |
| 2010/0032218 A1 * | 2/2010 | Ideshio et al. | 180/65.225 |
| 2011/0111910 A1 * | 5/2011 | Ideshio et al. | 475/5 |
| 2011/0152026 A1 * | 6/2011 | Williams | 475/86 |

FOREIGN PATENT DOCUMENTS

| | | |
|---|---|---|
| JP | A-10-109558 | 4/1998 |
| JP | A-2002-071017 | 3/2002 |
| JP | A-2002-264685 | 9/2002 |
| JP | A-2004-204960 | 7/2004 |
| JP | A-2006-7989 | 1/2006 |
| JP | A-2007-131107 | 5/2007 |
| JP | A-2007-255566 | 10/2007 |
| JP | A-2007-315444 | 12/2007 |
| JP | A-2010-120543 | 6/2010 |

* cited by examiner

|  |  | Low | ←→ | N | ←→ | High |
|---|---|---|---|---|---|---|
| HL1 | ON OFF | | | | | |
| HL2 | ON OFF | | | | | |
| HL3 | ON OFF | | | | | |

VEHICLE DRIVE DEVICE

TECHNICAL FIELD

The present invention relates to a vehicle drive device including a transmission mechanism that selectively establishes one of a low range and a high range and that power-transmissively connects an output shaft to drive wheels, a range changing mechanism that changes the range of the transmission mechanism, a motor generator that inputs drive force to the transmission mechanism, and a control device that controls the changing of the range.

BACKGROUND ART

A transmission mechanism included in a conventional vehicle drive device is capable of changing the speed range between a low range (L) and a high range (H) in response to, for example, a driver's operation of a range changing switch and the like (see, for example, Patent Literatures 1 and 2).

The transmission mechanism generally changes the range in a state in which an output shaft of the transmission mechanism is being stopped, for example during a vehicle stop. The transmission mechanism changes the range by, for example, sliding a clutch sleeve in the direction of the output shaft thereof and thereby connecting the clutch sleeve to a low gear or a high gear. The clutch sleeve is integrally rotatably and axially movably mounted externally around the output shaft of the transmission mechanism.

The low gear and the high gear each have, on the corresponding outer circumference thereof, a plurality of teeth (splines) that are circumferentially arranged at regular intervals. The clutch sleeve has, on the inner circumference thereof, a plurality of teeth (splines) that can be engaged with the teeth (splines) of the gears. When the inner teeth (splines) of the clutch sleeve are engaged (spline-fitted) with the outer teeth (splines) of the low gear or the high gear, the clutch sleeve is connected to the low gear or the high gear.

When the clutch sleeve is slid in one direction along the shaft to be connected to the low gear, a power transfer path is established through which low-speed rotational power is transmitted from the low gear and the clutch sleeve to the output shaft, thereby the "low range" is established.

When the clutch sleeve is slid in the opposite direction along the shaft to be connected to the high gear, a power transfer path is established through which high-speed rotational power is transmitted from the high gear and the clutch sleeve to the output shaft, thereby the "high range" is established. Note that when the clutch sleeve is in neutral position in which the clutch sleeve is connected neither to the low gear nor to the high gear, a neutral range state is established in which rotational power is not transmitted.

Patent Literature 1 discloses, in paragraphs [0014]-[0016], a vehicle transfer in which a power gear and a sleeve that is spline-fitted to the power gear are disposed between a low speed gear and a high speed gear, and in which the sleeve is spline-fitted to the low speed gear to establish a low speed mode and the sleeve is spline-fitted to the high speed gear to establish a high speed mode.

Patent Literature 2 discloses, in paragraphs [0014]-[0017], a vehicle sub-transmission in which an input gear and a sleeve that is spline-fitted to the input gear are disposed between a low speed side gear and a high speed side gear, and in which the sleeve is spline-fitted to the low speed side gear to establish a low speed mode and the sleeve is spline-fitted to the high speed side gear to establish a high speed mode. Patent Literature 2 also discloses that, in sliding the sleeve, energy is stored for moving the sleeve from a high speed side to a low speed side, or from the low speed side to the high speed side, thus the sleeve is slid with considerable energy.

PRIOR ART REFERENCE

Patent Literatures

[Patent Literature 1] JP 2006-007989 A
[Patent Literature 2] JP H10-109558 A

SUMMARY OF THE INVENTION

Problems to be Solved by the Invention

In the configuration disclosed in Patent Literatures 1 and 2, the sleeve is spline-fitted to the low gear or the high gear by being slid. However, it is difficult that the sleeve is spline-fitted if a difference in a rotational speed is considerable between the sleeve and the low/high gear.

For this reason, generally, changing of the range is performed under the condition that a propeller shaft and drive wheels are being stopped, for example, during stop of a vehicle. The changing of the range is prohibited in a state in which the propeller shaft ant the drive wheels are being rotated, for example, during travel.

For the purpose of changing the range during travel of the vehicle, a synchronous engaging mechanism may be provided between the sleeve and the gears. However, in order to equip with the synchronous engaging mechanism, high cost of equipment may be required. Here, there is a room for improvement.

In view of the above circumstances, it is an object of the present invention to provide a vehicle drive device that includes a transmission mechanism selectively establishing one of a low range and a high range and power-transmissively connecting an output shaft to drive wheels, a range changing mechanism changing the range of the transmission mechanism, a motor generator inputting drive force to the transmission mechanism, and a control device controlling the changing of the range. In the vehicle drive device, in response to a range change request in a state in which the drive wheels are rotated in the low range or in the high range, changing of the range is smoothly and quickly completed without using the synchronous engaging mechanism.

Means for Solving Problem

In a vehicle drive device that includes a transmission mechanism selectively establishing one of a low range and a high range and power-transmissively connecting an output shaft to drive wheels, a range changing mechanism changing the range of the transmission mechanism, a motor generator inputting drive force to the transmission mechanism, and a control device controlling the changing of the range, the present invention is configured as follows.

The range changing mechanism includes: a low gear piece and a high gear piece that are arranged and spaced apart from each other in an axial direction; a clutch sleeve that is slidably arranged in the axial direction so as to be engaged with one of the two gear pieces and that is integrally rotatably connected to the output shaft of the transmission mechanism; and a shift actuator that slides the clutch sleeve either forward or backward in the axial direction to be connected to one of the gear pieces. When the clutch sleeve is connected to the low gear piece, a low-range power transfer path is established, and when the clutch sleeve is connected to the high gear piece, a high-range power transfer path is established. Furthermore, the control device includes: a disengage processor that disengages the clutch sleeve from the currently engaged gear piece so as to establish a neutral range in response to a range change request in a state in which the drive wheels are rotated in the low range or in the high range; a rotation synchronization processor that controls an output rotational speed of the motor generator in the neutral range such that a difference between an input rotational speed and an output rotational speed of the transmission mechanism is set to be zero or be equal to or less than a predetermined value; and a connection processor that slides the clutch sleeve to be connected to a connection target gear piece.

Note that the connection of the clutch sleeve to the low gear piece or high gear piece is performed by engaging the gears with each other, however, the connection should not be limited to the expression "engaging the gears with each other". For example, connections such as a spline fitting, and a dog clutch meshing are included in the present invention.

With the configuration, the output shaft of the transmission mechanism is integrally rotatably connected to the clutch sleeve and is power-transmissibely connected to the drive wheels. Thus, when the clutch sleeve is connected to the low gear piece or the high gear piece while the drive wheels are being rotated during travel of the vehicle, the output shaft of the transmission mechanism and the clutch sleeve are rotated at a rotational speed corresponding to the rotational speed of the drive wheels.

When the range change is requested during the travel of the vehicle, if the difference in the rotational speed is considerable between the clutch sleeve and the connection target gear piece, it is difficult that the clutch sleeve is disengaged from the currently engaged gear piece and is connected to the connection target gear piece.

In such a situation, with the present invention, the transmission mechanism becomes in the neutral range, then the motor generator synchronizes the input rotational speed of the transmission mechanism, i.e. the rotational speed of the connection target gear piece with the output rotational speed of the transmission mechanism, i.e. the rotational speed of the clutch sleeve. After that, the clutch sleeve is slid to the connection target gear piece.

In this way, it is possible to connect the clutch sleeve relatively smoothly to the connection target gear piece. Thus, reliability of the range change can be increased. Since the synchronous engaging mechanism as described in the conventional example is not needed to be mounted on the range changing mechanism, it is possible to avoid increase of the cost of equipment.

Preferably, the disengage processor temporarily reduces engaging force between the clutch sleeve and the currently engaged gear piece, then slides the clutch sleeve to the neutral range side.

Here, a configuration of the disengage processor of the control device is specified, which clarifies the embodiment. Also, when establishing the neutral range, the engaging force of the engaging portion of the clutch sleeve with the currently engaged gear piece is reduced, and then the clutch sleeve is slid to the neutral range side. Thus, it is possible to disengage the clutch sleeve from the currently engaged gear piece with low friction.

Preferably, the vehicle drive device further includes a main transmission mechanism provided between the motor generator and an input shaft of the transmission mechanism. Also preferably, the main transmission mechanism is configured to have, as a main component, a Ravigneaux planetary gear set that includes a front sun gear that is supported by a case via a first friction engaging element, a rear sun gear that is connected to a rotor of the motor generator, a ring gear that is supported by the case via a second friction engaging element, a plurality of long pinion gears that is engaged with the ring gear and the rear sun gear, a plurality of short pinion gears that is engaged with the long pinion gears, and a carrier that is connected to the input shaft of the transmission mechanism so as to rotatably support the short pinion gears and the long pinion gears and that is rotated in synchronization with an orbital motion of the short pinion gears and the long pinion gears. Furthermore, the main transmission mechanism may be a high and low two-stage reduction mechanism that changes a gear ratio between the low range and the high range by engaging or disengaging the first friction engaging element and the second friction engaging element, so that the disengaging processor temporarily releases or slips the currently engaged friction engaging element between the two friction engaging elements in order to temporarily reduce the engaging force.

Here, a configuration of the vehicle drive device is specified as follows. The vehicle drive device includes the main transmission mechanism in addition to the motor generator, the transmission mechanism (as a sub-transmission mechanism), the range changing mechanism and the control device. Also, the disengage processor of the control device is specifically defined, which clarifies the embodiment. Furthermore, a configuration is specified to reduce the engaging force of the engaging portion of the clutch sleeve with the currently engaged gear piece when establishing the neutral range. With such a configuration, which clarifies the embodiment, the friction engaging element is released or slipped so that torque is not transmitted simply temporarily from the main transmission mechanism to the transmission mechanism. Thus, control is easy without shock.

Preferably, the shift actuator includes a shift fork shaft for sliding the clutch sleeve, a shift motor that generates rotational power, a power transfer mechanism that moves the shift fork shaft in an axial direction thereof using the rotational power generated by the shift motor, a low range detection element that outputs low range establishment information when a rotation angle of an output shaft of the shift motor reaches an angle at which the clutch sleeve is completely connected to the low gear piece, a high range detection element that outputs high range establishment information when a rotation angle of the output shaft of the shift motor reaches an angle at which the clutch sleeve is completely connected to the high gear piece. Also, preferably, the control device further includes a determination processor that determines whether or not the clutch sleeve, which has been slid by the connection processor, is connected to the connection target gear piece based on the output information from the respective detection elements.

Here, a configuration of the shift actuator is specified, and control of the range change by the control device is defined.

Preferably, the transmission mechanism is configured as a planetary gear set including a sun gear that receives input rotation, a ring gear that is non-rotatably disposed, a plurality of pinion gears that is disposed between the sun gear and the ring gear so as to be engaged with both of the sun gear and the ring gear, and a carrier that rotatably supports the pinion gears and is rotated in synchronization with an orbital motion of the pinion gears. Also preferably, the carrier is integrally rotatable with the low gear piece, and the sun gear is integrally rotatable with the high gear piece.

Here, a configuration of the transmission mechanism is specified. In the configuration, when the sun gear and the high gear piece are rotated in the positive rotation direction by the input rotation to the transmission mechanism, the pinion gears perform an orbital motion (revolution) while rotating in the same direction as that of the sun gear, whereby the carrier and the low gear piece rotate in synchronization with the orbital motion (revolution) of the pinion gears. Thus, the specific configuration of the transmission mechanism clarifies that the low and high gear pieces are rotated in the same direction as that of the input rotation to the transmission mechanism.

Preferably, the low gear piece is a gear with inner teeth, and the high gear piece is a gear with outer teeth and disposed inside the low gear piece without making contact with the low gear piece, and the clutch sleeve includes outer teeth capable of being engaged with the inner teeth of the low gear piece and inner teeth capable of being engaged with the outer teeth of the high gear piece.

With the configuration, specific positions, where the teeth of the low gear piece, the high gear piece, and the clutch sleeve are formed, are provided. Also, a specific relative position relationship between the low gear piece and the high gear piece is provided.

The vehicle drive device may further includes a second motor generator and the main transmission mechanism both provided between the motor generator and an input shaft of the transmission mechanism, and an engine provided via a power splitter that is disposed between the second motor generator and the motor generator.

Here, a configuration of the vehicle drive device is specified as follows. The vehicle drive device further includes the second motor generator, the main transmission mechanism, the power splitter and the engine, in addition to the motor generator (as a first motor generator), the transmission mechanism (as a sub-transmission mechanism), the range changing mechanism and the control device.

Effects of the Invention

The present invention is made to provide a vehicle drive device that includes a transmission mechanism selectively establishing one of a low range and a high range and power-transmissively connecting an output shaft to drive wheels, a range changing mechanism changing the range of the transmission mechanism, a motor generator inputting drive force to the transmission mechanism, and a control device controlling the changing of the range. In the vehicle drive device according to the present invention, in response to a range change request in a state in which the drive wheels are rotated in the low range or in the high range, changing of the range is smoothly and quickly completed without using the synchronous engaging mechanism.

MODES FOR CARRYING OUT THE INVENTION

Best modes for carrying out the present invention will be described in detail hereinafter with reference to the accompanying drawings.

FIGS. 1-16 show an embodiment of the present invention. A general configuration of a vehicle drive device according to the embodiment of the present invention will be described with reference to FIG. 1. In this embodiment, a part-time four-wheel-drive hybrid vehicle drive device will be illustrated. The hybrid vehicle drive device has, as a basic configuration, a front-engine rear-wheel-drive (FR) vehicle drive device.

Figure 1:
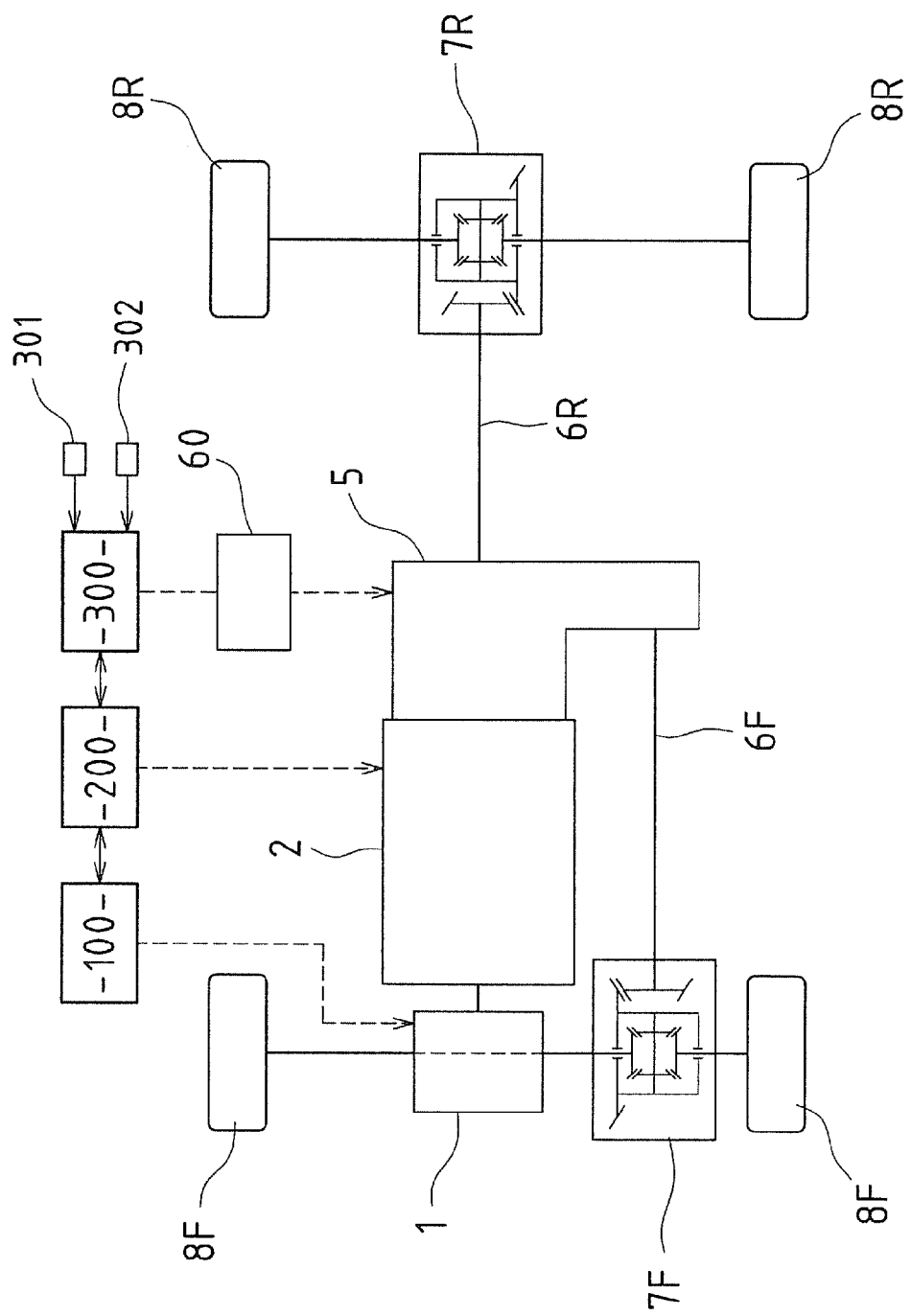
FIG. 1 is a diagram schematically showing a configuration of a vehicle drive device according to an embodiment of the present invention.

The vehicle drive device of FIG. 1 includes an engine 1, a hybrid transmission 2, a transfer 5, a front propeller shaft 6F, a rear propeller shaft 6R, a front differential 7F, a rear differential 7R, front wheels 8F, and rear wheels 8R. While these components will be described hereinafter, components that are not directly related to the features of the present invention will be schematically shown and briefly described.

—Engine—

The engine 1 is a known drive source that burns fuel to output power, such as a gasoline engine, a diesel engine and the like. An operating state of the engine 1 is controlled by an engine control computer 100 that manages a throttle opening degree (amount of intake gas), an amount of fuel injected, a timing of ignition and the like.

A crankshaft (output shaft) 11 of the engine 1 is connected via a damper 12 to a power splitter 3. Note that the damper 12 is a device for absorbing fluctuation of torque of the engine 1.

—Hybrid Transmission—

Figure 2:
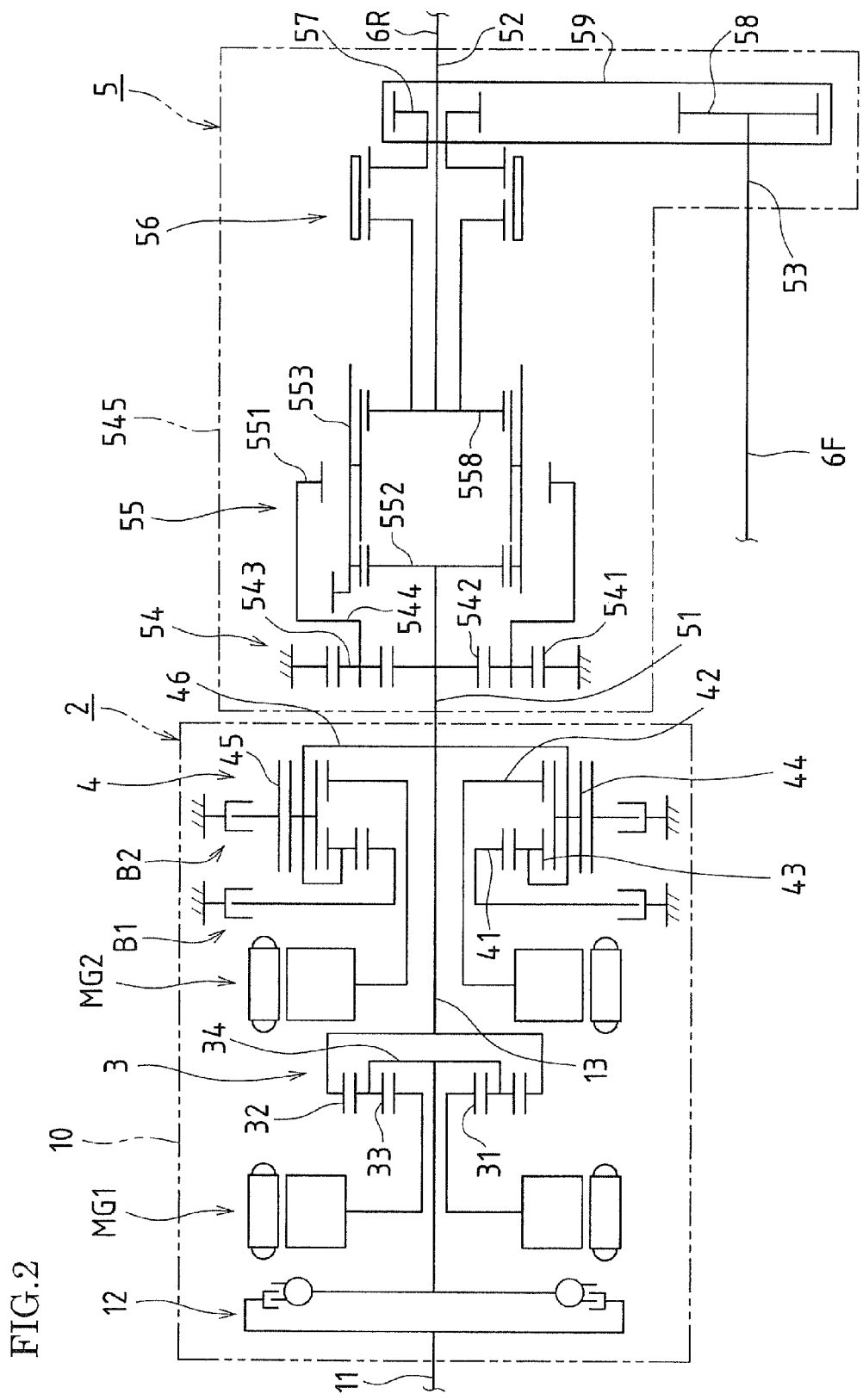
FIG. 2 is a diagram schematically showing a configuration of a hybrid transmission and a transfer of FIG. 1.

As shown in FIG. 2, the hybrid transmission 2 includes a first motor generator MG1, a second motor generator MG2, the power splitter 3, a main transmission mechanism 4 and the like.

—Motor Generator—

The first motor generator MG1 and the second motor generator MG2 are each an alternating-current synchronous motor, which functions as a motor and also serves as a generator.

The first motor generator MG1 and the second motor generator MG2 are each connected via an inverter to a battery (electricity storage device), although not shown. By controlling the inverter using a power management control computer 200, each motor generator MG1 and MG2 is switched between a regenerative state and a power (assisted) state. Regenerated power is stored via the inverter in the battery. Power for driving the first motor generator MG1 and the second motor generator MG2 is supplied from the battery via the inverter thereto.

—Power Splitter—

The power splitter 3 includes, as a main component, a single pinion type planetary gear set that includes a sun gear (a gear with outward-facing teeth (outer teeth)) 31, a ring gear (a gear with inward-facing teeth (inner teeth)) 32, a plurality of pinion gears (gears with outward-facing teeth (outer teeth)) 33, a carrier 34 and the like.

The ring gear 32 is provided outside the sun gear 31. The ring gear 32 and the sun gear 31 are concentrically arranged and spaced apart from each other. The pinion gears 33 are provided in an annular space between the sun gear 31 and the ring gear 32 so as to be engaged with the sun gear 31 and the ring gear 32. The carrier 34 rotatably supports the pinion gears 33, and can be rotated in synchronization with the orbital motion (revolution) of the pinion gears 33.

The carrier 34 is connected via the damper 12 to the crankshaft 11 of the engine 1. The sun gear 31 is connected to a rotor of the first motor generator MG1. A power transfer shaft 13 is connected to the ring gear 32. The power transfer shaft 13 is connected via the main transmission mechanism 4 to the second motor generator MG2. The power transfer shaft 13 is also connected to a transfer input shaft 51.

An operation of the power splitter 3 thus configured will be described. When the first motor generator MG1 operates as a generator, power input from the engine 1 to the carrier 34 is split into power that is used via the sun gear 31 to drive the first motor generator MG1 as a generator and power that is used via the ring gear 32 to drive the wheels (the front wheels 8F and the rear wheels 8R). On the other hand, when the first motor generator MG1 operates as a motor, power input from the engine 1 to the carrier 34 and power input from the first motor generator MG1 to the sun gear 31 are integrated and then output to the ring gear 32.

—Main Transmission Mechanism—

The main transmission mechanism 4 is a two-stage (high and low) reduction mechanism that includes a Ravigneaux planetary gear set as a main component. The main transmission mechanism 4 includes a front sun gear (a gear with outer teeth) 41, a rear sun gear (a gear with outer teeth) 42, a short pinion gear (a gear with outer teeth) 43, a long pinion gear (a gear with outer teeth) 44, a ring gear (a gear with inner teeth) 45, a carrier 46 and the like.

The front sun gear 41 is engaged with the short pinion gear 43. The short pinion gear 43 is engaged with the long pinion gear 44. The long pinion gear 44 is engaged with the ring gear 45 and the rear sun gear 42. The ring gear 45 and the front and rear sun gears 41 and 42 are concentrically arranged and spaced apart from each other. The carrier 46 rotatably supports the short and long pinion gears 43 and 44, and can be rotated in synchronization with the orbital motion (revolution) of the short and long pinion gears 43 and 44.

The carrier 46 is connected to the power transfer shaft 13 and the transfer input shaft 51. The rear sun gear 42 is connected to a rotor of the second motor generator MG2. The front sun gear 41 is supported by a transmission case 10 via a first brake B1. The ring gear 45 is supported by the transmission case 10 via a second brake B2.

Moreover, the main transmission mechanism 4 includes the first and second brakes B1 and B2 as switch elements for switching the gear ratio between a low range (low gear ratio) and a high range (high gear ratio). The brakes B1 and B2 are each, for example, a multi-plate or band hydraulic friction engaging element that produces engagement force with the pressure of hydraulic fluid. The brakes B1 and B2 are each configured so that the torque capacity varies continuously, depending on engagement pressure produced by a hydraulic actuator (not shown) and the like.

When the first brake B1 is deactivated or released, the front sun gear 41 is disengaged from the non-rotating transmission case 10 so that the front sun gear 41 can be rotated relatively. On the other hand, when the first brake B1 is actuated or engaged, the front sun gear 41 is connected to and integrated with the transmission case 10 so that the front sun gear 41 cannot be rotated. When the second brake B2 is deactivated or released, the ring gear 45 is released from the transmission case 10 so that the ring gear 45 can rotate relatively. On the other hand, when the second brake B2 is actuated or engaged, the ring gear 45 is connected to and integrated with the transmission case 10 so that the ring gear 45 cannot be rotated.

Here, when the first brake B1 is deactivated (released) and the second brake B2 is actuated (engaged), the ring gear 45 cannot be rotated, so that the carrier 46 and the power transfer shaft 13 are rotated at a low speed (low range) by the ring gear 45 and the rear sun gear 42 that is rotated by the second motor generator MG2. When the second brake B2 is deactivated (released) and the first brake B1 is actuated (engaged), the carrier 46 and the power transfer shaft 13 are rotated at a high speed (high range) by the non-rotating front sun gear 41, the rear sun gear 42 rotated by the second motor generator MG2, and the non-rotating ring gear 45. Note that when both the brakes B1 and B2 are deactivated (released), the carrier 46 and the power transfer shaft 13 are in an idle rotation state or in a neutral state (neutral range).

—Transfer—

Figure 3:
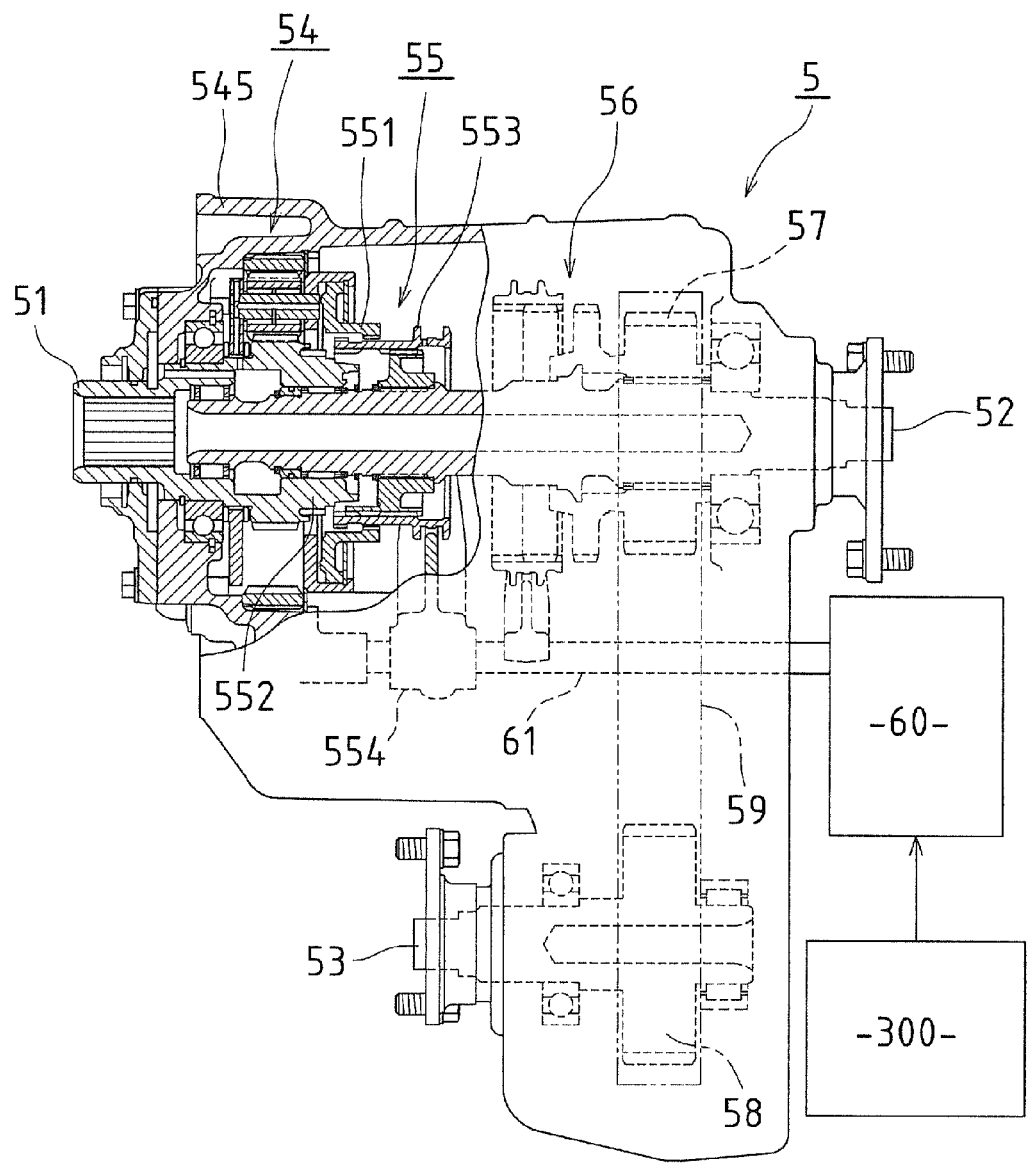
FIG. 3 is a cross-sectional view showing a specific configuration of a sub-transmission mechanism and a range changing mechanism of the transfer of FIGS. 1 and 2.

As shown in FIGS. 2 and 3, the transfer 5 includes the transfer input shaft 51, a rear output shaft 52, a front output shaft 53, the sub-transmission mechanism 54, a range changing mechanism 55, a mode changing mechanism 56 and the like.

The transfer input shaft 51 is rotatably supported by a transfer case 545 via a rolling-element bearing (not shown). The transfer input shaft 51 receives rotational power output from the main transmission mechanism 4.

The rear output shaft 52 is disposed on the same axis as the transfer input shaft 51. The front output shaft 53 is disposed parallel to the rear output shaft 52. Power transfer elements (57, 58 and 59) are provided between the rear output shaft 52 and the front output shaft 53. That is, a drive gear 57 is mounted on the outside of the rear output shaft 52 via a suitable rolling-element bearing (not shown), and a driven gear 58 is integrally formed on the outside of the front output shaft 53. Also, an endless member 59, such as a drive chain, and a drive belt, is wrapped on and hung around the drive gear 57 and the driven gear 58.

The rear output shaft 52 outputs the rotational power to the left and right rear wheels 8R via the rear propeller shaft 6R, the rear differential 7R and left and right rear drive shafts (reference numerals omitted). The front output shaft 53 outputs the rotational power to the left and right front wheels 8F via the front propeller shaft 6F, the front differential 7F and left and right front drive shafts (reference numerals omitted).

—Sub-Transmission Mechanism—

Figure 4:
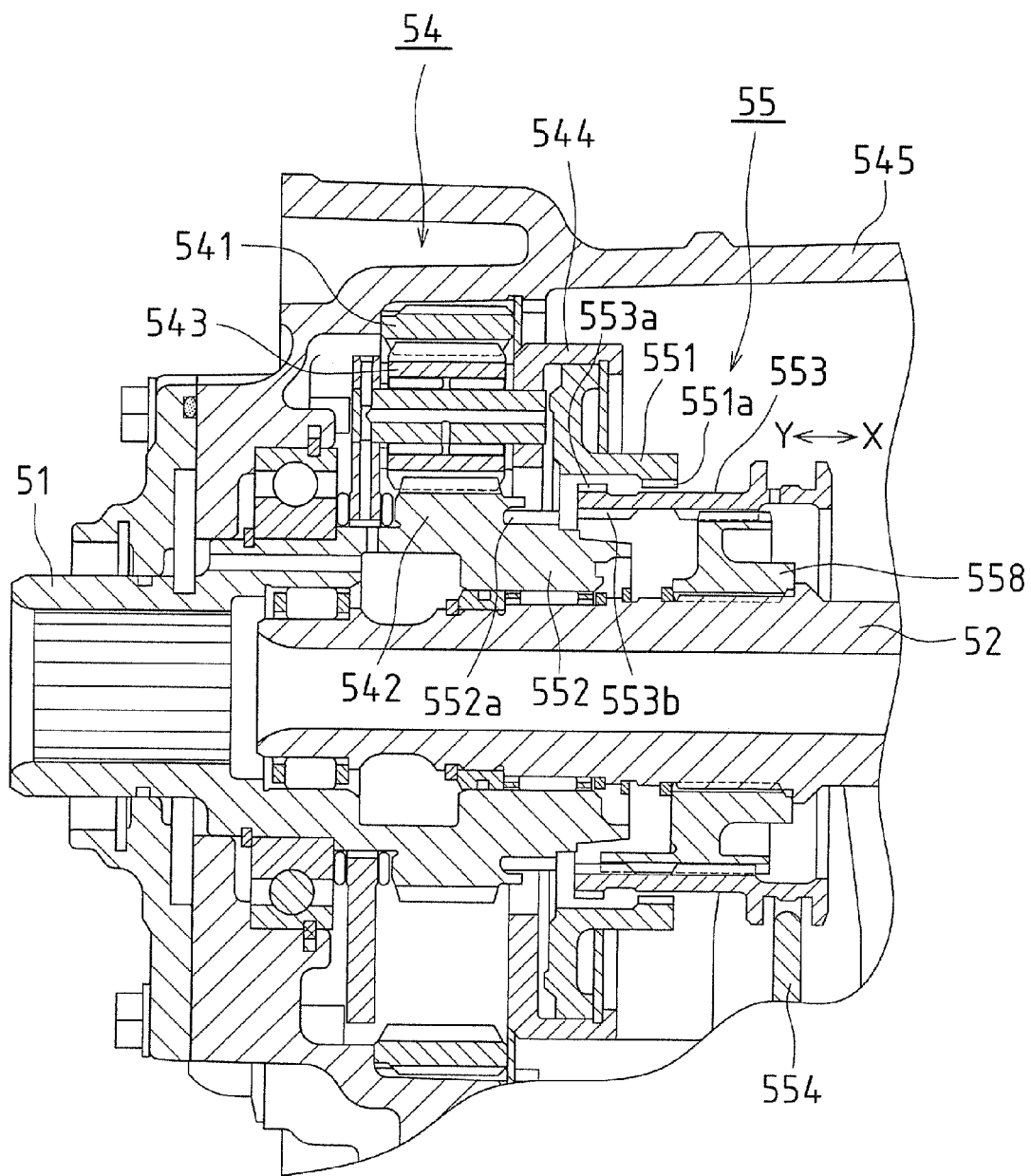
FIG. 4 is an enlarged view of the sub-transmission mechanism and the range changing mechanism of FIG. 3, showing a clutch sleeve in a neutral position (neutral range).

As shown in FIGS. 2-4, the sub-transmission mechanism 54 is configured as a two-stage (high and low) reduction mechanism that includes a single pinion type planetary gear set as a main component. The sub-transmission mechanism 54 includes a ring gear (a gear with inner teeth) 541, a sun gear (a gear with outer teeth) 542, a plurality of pinion gears (gears with outer teeth) 543, a carrier 544 and the like.

The ring gear 541 is fixed to the transfer case 545 so that the ring gear 541 cannot be rotated or axially moved. The sun gear 542 is provided inside the ring gear 541 so as to be spaced apart from the ring gear 541, and is integrally rotatably connected to the transfer input shaft 51. The pinion gears 543 are provided in an annular space between the ring gear 541 and the sun gear 542 so as to be engaged with the ring gear 541 and the sun gear 542. The carrier 544 rotatably supports the pinion gears 543, and can be rotated in synchronization with the orbital motion (revolution) of the pinion gears 543.

—Mode Changing Mechanism—

The mode changing mechanism 56 selectively establishes a four-wheel drive mode (4WD) or a two-wheel drive mode (2WD) in response to an operation that is performed by a driver using, for example, a drive mode changing switch (not shown) provided in the vicinity of a driver's seat (not shown).

In the four-wheel drive mode (4WD), a power transfer path is established through which the rotational power input to the transfer input shaft 51 is output from both the rear and front output shafts 52 and 53.

In the two-wheel drive mode (2WD), a power transfer path is established through which the rotational power input to the transfer input shaft 51 is output from only the rear output shaft 52.

In other words, when the mode changing mechanism 56 allows the drive gear 57 to be rotated together with the rear output shaft 52, the four-wheel drive mode (4WD) is switched on to establish the power transfer path through which the rotational power from the transfer input shaft 51 to the rear output shaft 52 is transferred via the drive gear 57, the endless member 59, and the driven gear 58 to the front output shaft 53.

On the other hand, when the mode changing mechanism 56 allows the drive gear 57 to be rotated relative to the rear output shaft 52, the two-wheel drive mode (2WD) is switched on to establish the power transfer path through which the rotational power from the transfer input shaft 51 to the rear output shaft 52 is not transferred to the front output shaft 53, and the rotational power is output from only the rear output shaft 52.

—Range Changing Mechanism—

The range changing mechanism 55 selectively establishes one of the low range (L) and the high range (H) of the sub-transmission mechanism 54 in response to an operation that is performed by a driver using, for example, a speed range changing switch (not shown) provided in the vicinity of a driver's seat (not shown).

In the high range (H), a power transfer path is established through which the rotational power input to the transfer input shaft 51 is transferred from the sun gear 542 of the sub-transmission mechanism 54 to the rear output shaft 52, i.e., the transfer input shaft 51 is connected directly to the rear output shaft 52.

In the low range (L), a power transfer path is established through which the rotational power input to the transfer input shaft 51 is transferred from the carrier 544 of the sub-transmission mechanism 54 to the rear output shaft 52, i.e., the orbital speed (revolution speed) of the carrier 544 is output to the rear output shaft 52. A speed reduction ratio in the low range is appropriately determined based on diameters, gear ratios and the like of parts of the sub-transmission mechanism 54.

The neutral range (N) is neither the low range nor the high range, i.e., a neutral state in which the rotational power input to the transfer input shaft 51 is not transferred to the rear output shaft 52.

As shown in FIGS. 2-4, the range changing mechanism 55 includes a low gear piece 551, a high gear piece 552, a clutch sleeve 553, a shift fork 554 and the like. The operation of the range changing mechanism 55 is controlled by a transfer shift actuator 60 and a 4WD control computer 300.

The low gear piece 551 is integrally rotatably connected to the carrier 544 of the sub-transmission mechanism 54. The low gear piece 551 is a gear with inner teeth. Specifically, a plurality of inner teeth 551a are circumferentially arranged at regular intervals on the inner circumferential surface of the low gear piece 551 at an end portion downstream in a direction in which the rotational power is input.

The high gear piece 552 is integrally formed, in a protruding manner, on a side surface of the sun gear 542 of the sub-transmission mechanism 54. The high gear piece 552 is a gear with outer teeth. Specifically, a plurality of outer teeth 552a are circumferentially arranged at regular intervals on the outer circumferential surface of the high gear piece 552 in a region close to the sun gear 542.

The clutch sleeve 553 is integrally rotatably and axially movably mounted on the outside of the rear output shaft 52 via a hub sleeve 558. On the inner circumferential surface of the clutch sleeve 553, inner splines 553c are provided so as to be engaged with outer splines 558a of the hub sleeve 558.

A plurality of outer teeth 553a is circumferentially arranged at regular intervals on the outer circumferential surface of the clutch sleeve 553 at an end portion upstream in the direction in which the rotational power is input, and are engaged with the inner teeth 551a of the low gear piece 551. A plurality of inner teeth 553b is circumferentially arranged at regular intervals on the inner circumferential surface of the clutch sleeve 553 at an end portion upstream in the direction in which the rotational power is input, and are engaged with the outer teeth 552a of the high gear piece 552.

The teeth 551a, 552a, 553a, and 553b are also called splines. The gear pieces 551 and 552 are also called spline pieces.

The low gear piece 551 has a cylindrical shape. The high gear piece 552 is provided inside the cylinder without making contact with each other. The inner teeth 551a of the low gear piece 551 are spaced apart from the outer teeth 552a of the high gear piece 552 in the axial direction. The outer and inner teeth 553a and 553b of the clutch sleeve 553 are provided in a space in the axial direction between the inner teeth 551a of the low gear piece 551 and the outer teeth 552a of the high gear piece 552. In the neutral range, the outer and inner teeth 553a and 553b of the clutch sleeve 553 are engaged with neither the inner teeth 551a of the low gear piece 551 nor the outer teeth 552a of the high gear piece 552.

The inner teeth 551a of the low gear piece 551, the outer teeth 552a of the high gear piece 552, and the outer and inner teeth 553a and 553b of the clutch sleeve 553 all have, for example, a double chamfer or a single chamfer (not shown) at respective tips thereof in the engagement direction. For example, the double chamfer means a surface made by beveling a tooth tip into a pointed shape, such as an isosceles triangle in planar view. The single chamfer means a surface made by beveling a tooth tip into a shape such as a right triangle in planar view.

The shift fork 554 is used for moving the clutch sleeve 553 in the axial direction in parallel to the rear output shaft 52.

Figure 7:
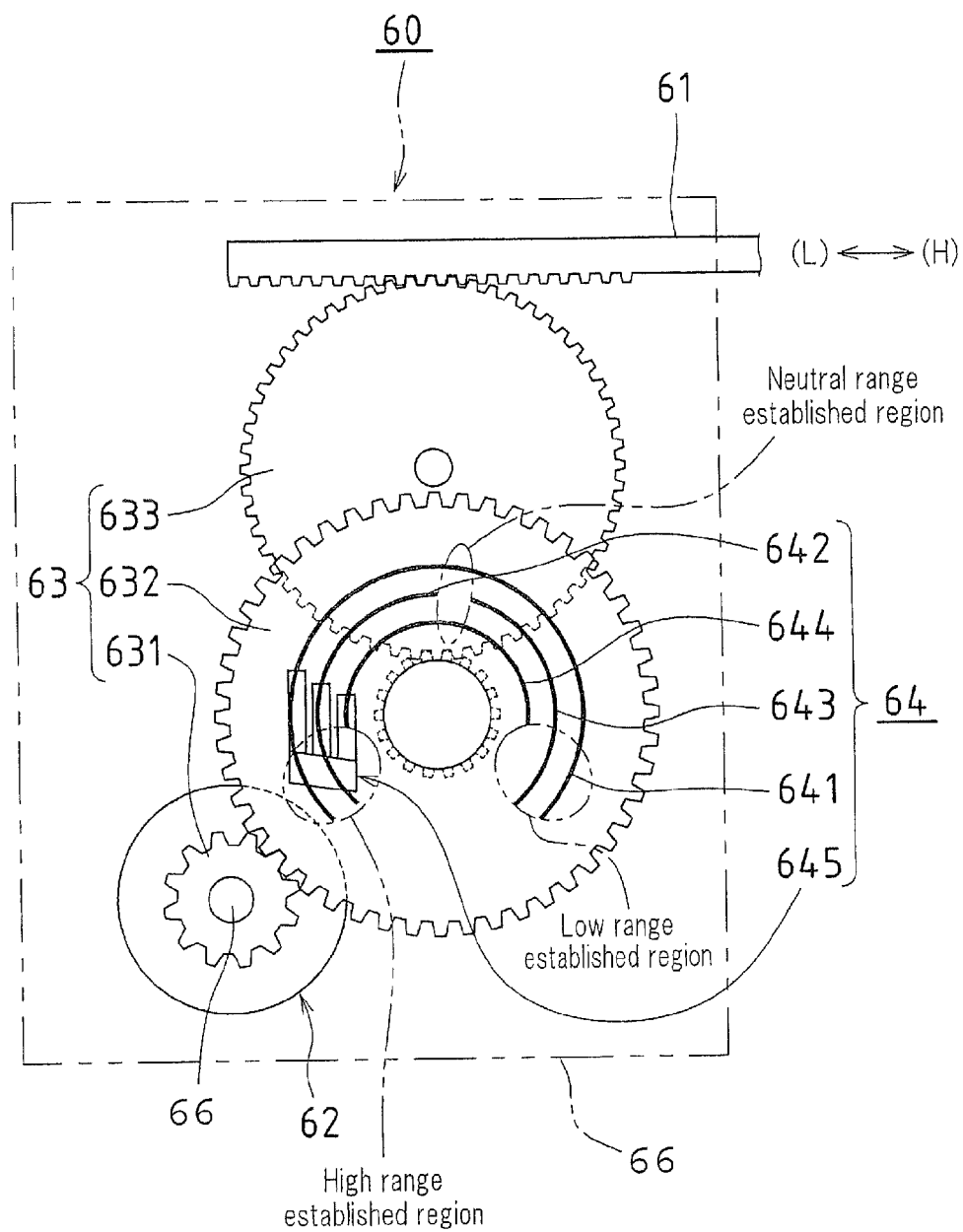
FIG. 7 is a partially transparent schematic view of a transfer shift actuator.

The transfer shift actuator 60 drives the shift fork 554. As shown in FIG. 7, the transfer shift actuator 60 includes a shift fork shaft 61, a shift motor 62, a power transfer mechanism 63 and the like. (not shown in detail).

The shift fork shaft 61 is provided to move the shift fork 554 in parallel to a center axis line of the clutch sleeve 553. The shift motor 62 generates rotational power. The power transfer mechanism 63 reduces the rotational power generated by the shift motor 62 and transfers the resultant rotational power to the shift fork shaft 61, thereby sliding the shift fork shaft 61 in the axial direction. The power transfer mechanism 63 includes a combination of a plurality of gears 631, 632 and 633. The shift fork shaft 61 has spur teeth that are engaged with the final gear 633. The final gear 633 and the spur teeth convert the rotational power into linear drive force.

The transfer shift actuator 60 includes a limit switch 64 in order to confirm that the sub-transmission mechanism 54 has changed the range.

The limit switch 64 outputs a signal identifying one of the following states: a rotation angle of an output shaft 65 of the shift motor 62 has reached an angle at which the clutch sleeve 553 is completely engaged with the low gear piece 551 [low range (L)]; a rotation angle has reached an angle at which the clutch sleeve 553 is completely engaged with the high gear piece 552 [high range (H)]; a rotation angle has reached an intermediate angle at which the clutch sleeve 553 is engaged with neither the low gear piece 551 nor the high gear piece 552 [neutral range (N)]; a rotation angle has reached an angle that is located at a region between the neutral range (N) and the low range (L); and a rotation angle has reached an angle that is located at a region between the neutral range (N) and the high range (H).

Figure 8:
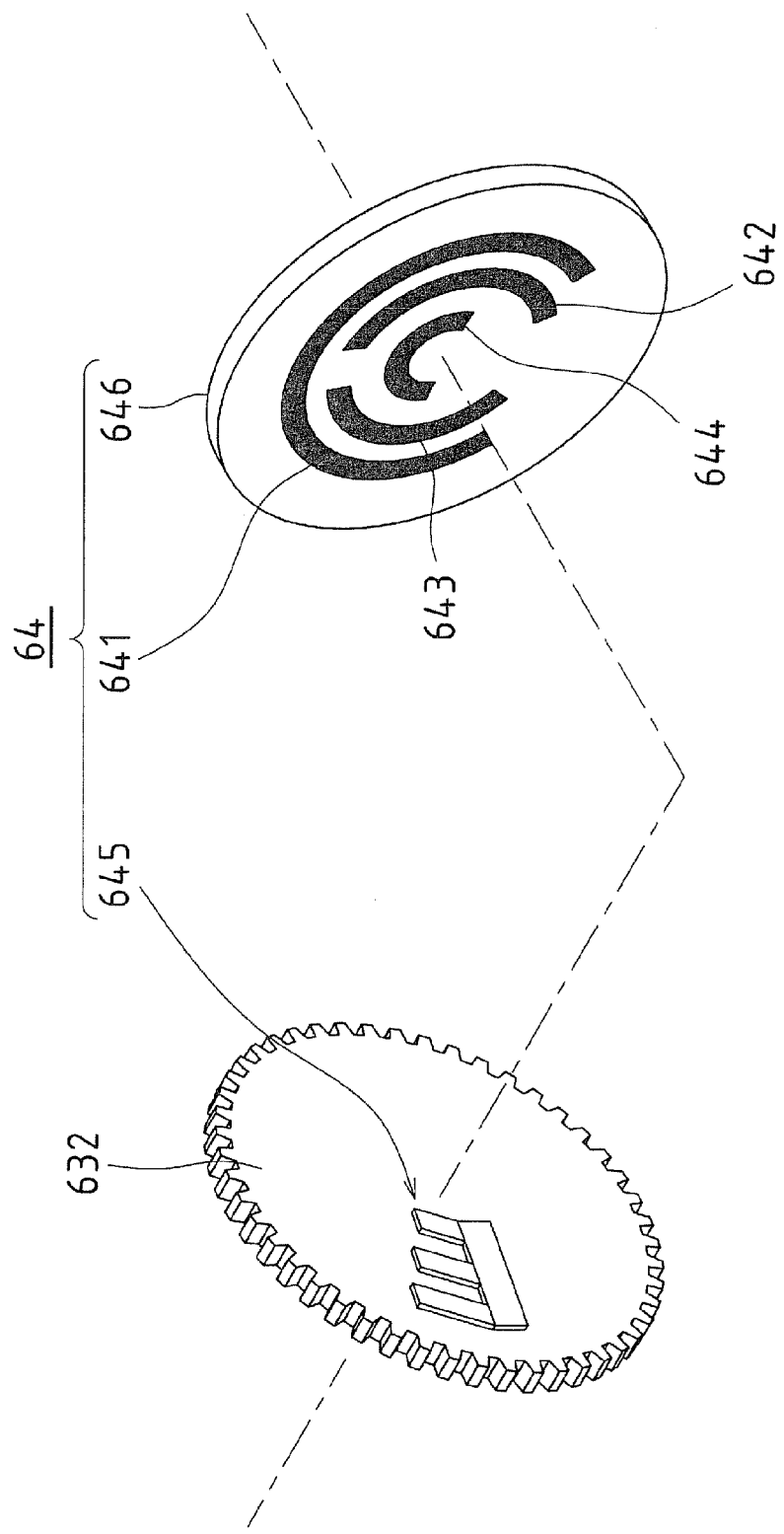
FIG. 8 is a diagram showing a configuration of a limit switch of the transfer shift actuator of FIG. 7.
Figures 9, 10:
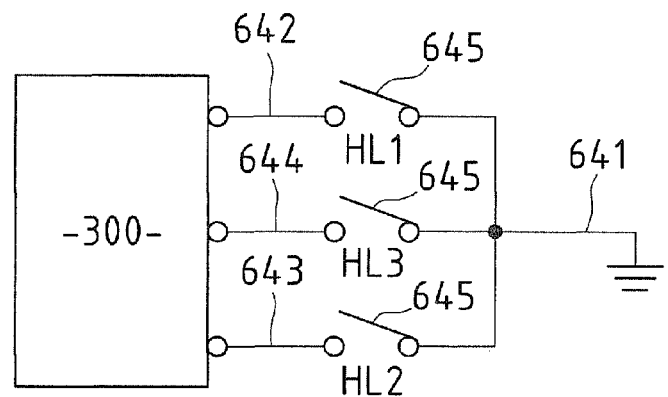
FIG. 9 is a diagram showing an electrical circuit representing the limit switch of FIG. 8.
FIG. 10 is a table showing a relationship between combinations of "on" and "off" of first to third contact points of the limit switch of FIG. 8 and established ranges of the sub-transmission mechanism.

Specifically, as shown in FIGS. 7-9, the limit switch 64 includes a common line 641, three signal lines 642-644, and a contact spring 645, which provide three contact points HL1-HL3.

The common line 641 and the three signal lines 642-644, which are made of a conductive film formed on a surface of a printed wiring board 646, are fixed to a case 66 and the like of the transfer shift actuator 60. The contact spring 645, which is made of a conductive material, is fixed to one side of the second gear 632 of the power transfer mechanism 63. The contact spring 645 is rotated together with the second gear 632 so that the common line 641 and the first to third signal lines 642-644 are selectively made to be conductive, according to the rotation angle of the second gear 632. Note that, in FIG. 7, the printed wiring board 646 is not shown and only the lines 641-644 are shown for ease of understanding a relative position relationship between the lines 641-644 and the contact spring 645.

The common line 641, the first signal line 642 and the contact spring 645 constitute the first contact point HL1. The common line 641, the second signal line 643 and the contact spring 645 constitute the second contact point HL2. The common line 641, the third signal line 644 and the contact spring 645 constitute the third contact point HL3.

When the common line 641 and the first signal line 642 are made to be conductive by the contact spring 645, the first contact point HL1 is turned "on." When the common line 641 and the first signal line 642 are made to be non-conductive, the first contact point HL1 is turned "off." When the common line 641 and the second signal line 643 are made to be conductive by the contact spring 645, the second contact point HL2 is turned "on." When the common line 641 and the second signal line 643 are made to be non-conductive, the second contact point HL2 is turned "off." When the common line 641 and third signal line 644 are made to be conductive by the contact spring 645, the third contact point HL3 is turned "on." When the common line 641 and third signal line 644 are made to be non-conductive, the third contact point HL3 is turned "off."

Next, a relationship between combinations of "on" and "off" of the three contact points HL1-HL3 of the limit switch 64, and the established ranges of the sub-transmission mechanism 54 will be described with reference to a table shown in FIG. 10.

(1) If the first contact point HL1 is "off," the second contact point HL2 is "on," and the third contact point HL3 is "off" (the tips of the protrusions of the contact spring 645 are located in a region where the low range is established in FIG. 7), the 4WD control computer 300 determines that the current range is the "low range (L)."

(2) If the first contact point HL1 is "on," the second contact point HL2 is "off," and the third contact point HL3 is "off" (the tips of the protrusions of the contact spring 645 are located in a region where the high range is established in FIG. 7), the 4WD control computer 300 determines that the current range is the "high range (H)."

(3) If the first contact point HL1 is "off," the second contact point HL2 is "off," and the third contact point HL3 is "on" (the tips of the protrusions of the contact spring 645 are located in a region where the neutral range is established in FIG. 7), the 4WD control computer 300 determines that the current range is the "neutral range (N)."

(4) If the first contact point HL1 is "off," the second contact point HL2 is "on," and the third contact point HL3 is "on," the 4WD control computer 300 determines that the current range is in a "region between the neutral range (N) and the low range (L)."

(5) If the first contact point HL1 is "on," the second contact point HL2 is "off," and the third contact point HL3 is "on," the 4WD control computer 300 determines that the current range is in a "region between the neutral range (N) and the high range (H)."

The combinations of "on" and "off" of the three contact points HL1-HL3 are low range establishment information and high range establishment information described in the appended claims. The limit switch 64 corresponds to a low range detection element and a high range detection element described in the appended claims.

—Control System—

The engine control computer 100, the power management control computer 200, and the 4WD control computer 300 have respective known configurations including a CPU (central processing unit), a ROM (program memory), a RAM (data memory), a backup RAM (non-volatile memory) and the like, although not shown.

The ROM stores such as various control programs, and maps that are referenced when the control programs are executed. The CPU executes calculation processing based on the control programs and the maps stored in the ROM. The RAM is a memory that temporarily stores such as results of calculation by the CPU, and data input from sensors. The backup RAM is a non-volatile memory that stores data and the like that should be saved when the engine 1 is stopped.

The 4WD control computer 300 is configured to perform the following controls: range changing control related to changing of the speed range between the high range (H) and the low range (L) of the sub-transmission mechanism 54 in response to input of a range change signal corresponding to a driver's operation of the speed range changing switch (not shown); mode changing control related to changing of the drive mode between the two-wheel drive mode (2WD) and the four-wheel drive mode (4WD) in response to input of a mode change signal corresponding to a driver's operation of the drive mode changing switch (not shown); and the like.

Next, an operation of the range changing mechanism 55 will be described. Changing of the speed range can be performed, for example, when the drive mode is set to the four-wheel drive mode (4WD).

Figure 5:
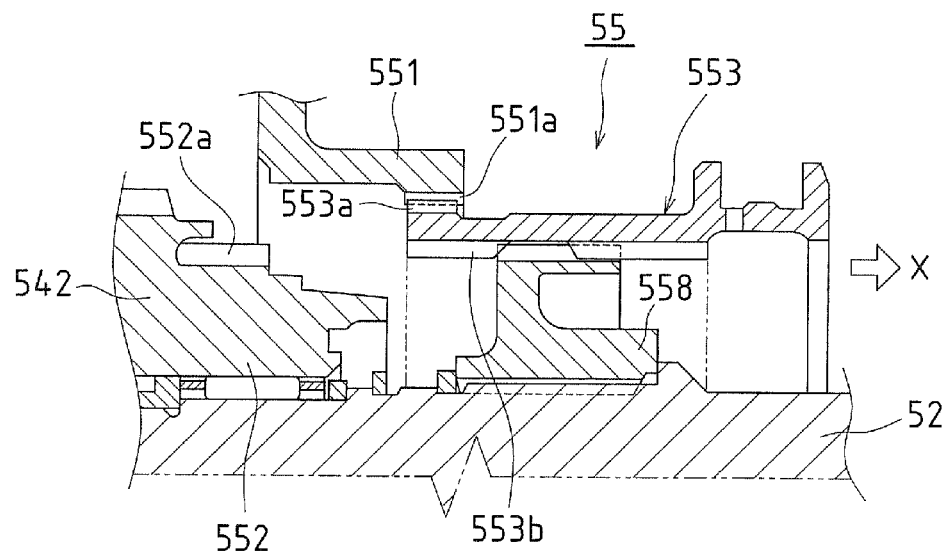
FIG. 5 is a diagram showing the range changing mechanism of FIG. 4 in a low range.
Figure 11:
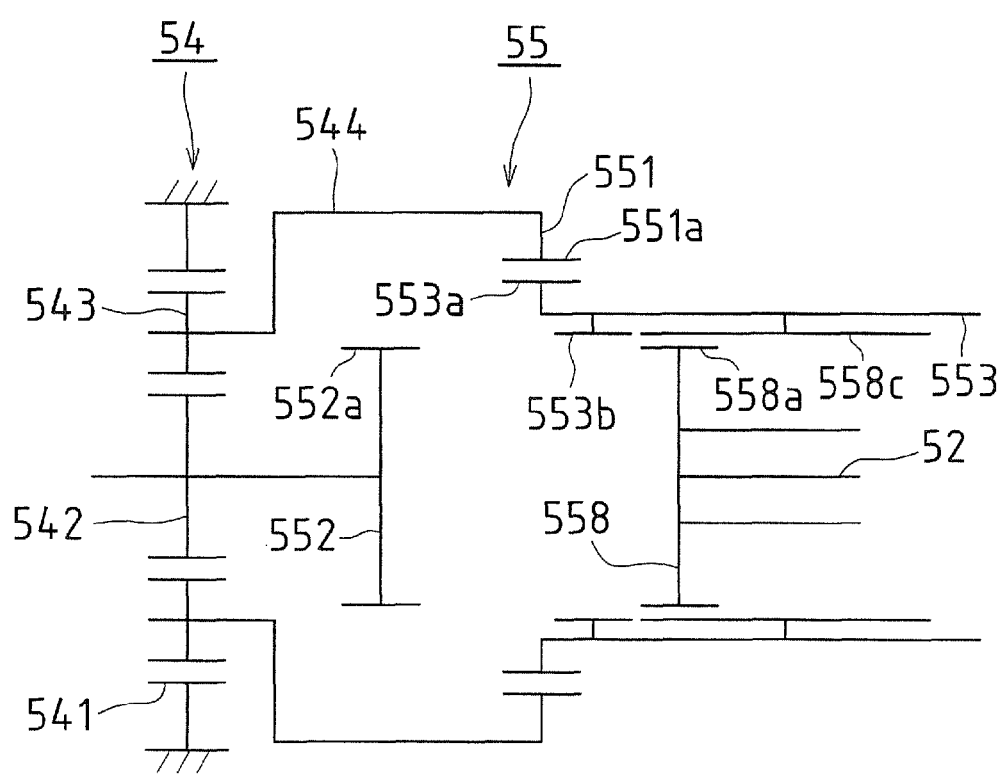
FIG. 11 is a diagram showing the sub-transmission mechanism and the range changing mechanism of FIG. 2, being in a low range.

Here, if the speed range changing switch (not shown) selects the low range (L), the 4WD control computer 300 actuates the transfer shift actuator 60 so that the shift fork 554 is moved in a direction indicated by an arrow X in FIG. 4 (to the right on the drawing sheet), whereby the clutch sleeve 553 is slid in the same direction. As a result, as shown in FIGS. 5 and 11, the outer teeth 553a of the clutch sleeve 553 are engaged with the inner teeth 551a of the low gear piece 551.

As a result, a low-range power transfer path is established through which the rotational power input to the transfer input shaft 51 is transferred, in the following order, to: the carrier 544 of the sub-transmission mechanism 54; the clutch sleeve 553; the hub sleeve 558; the rear output shaft 52; and the front output shaft 53. Thus, the low range (L) is established.

Figure 6:
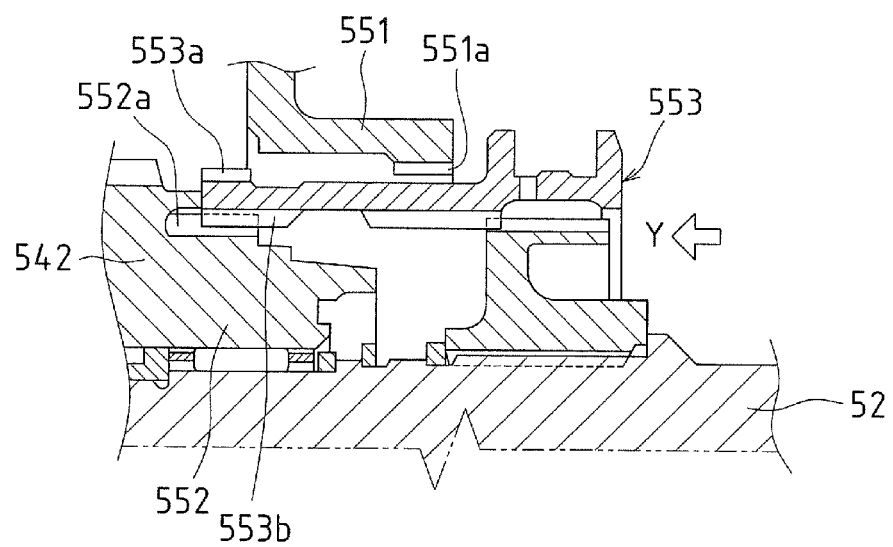
FIG. 6 is a diagram showing the range changing mechanism of FIG. 4 in a high range.
Figure 12:
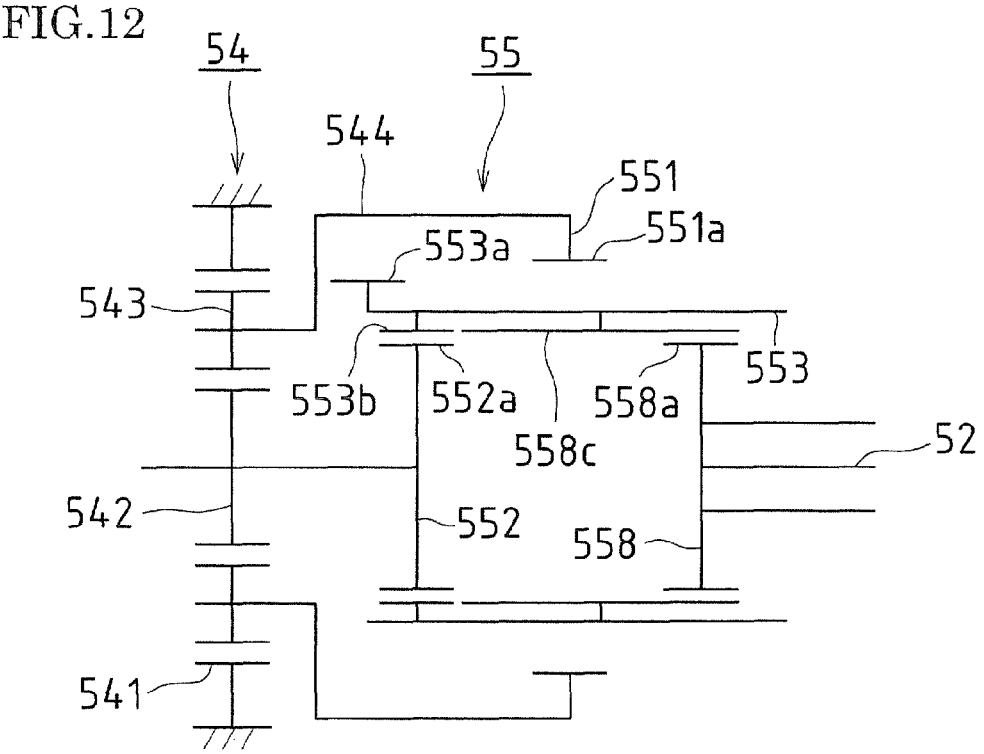
FIG. 12 is a diagram showing the sub-transmission mechanism and the range changing mechanism of FIG. 2, being in a high range.

On the other hand, if the speed range changing switch (not shown) selects the high range (H), the 4WD control computer 300 actuates the transfer shift actuator 60 so that the shift fork 554 is moved in a direction indicated by an arrow Y in FIG. 4 (to the left on the drawing sheet), whereby the clutch sleeve 553 is slid in the same direction. As a result, as shown in FIGS. 6 and 12, the inner teeth 553b of the clutch sleeve 553 are engaged with the outer teeth 552a of the high gear piece 552.

As a result, a high-range power transfer path is established through which the rotational power input to the transfer input shaft 51 is transferred, in the following order, to: the sun gear 542 of the sub-transmission mechanism 54; the clutch sleeve 553; the hub sleeve 558; the rear output shaft 52; and the front output shaft 53. Thus, the high range (H) is established.

Figure 13:
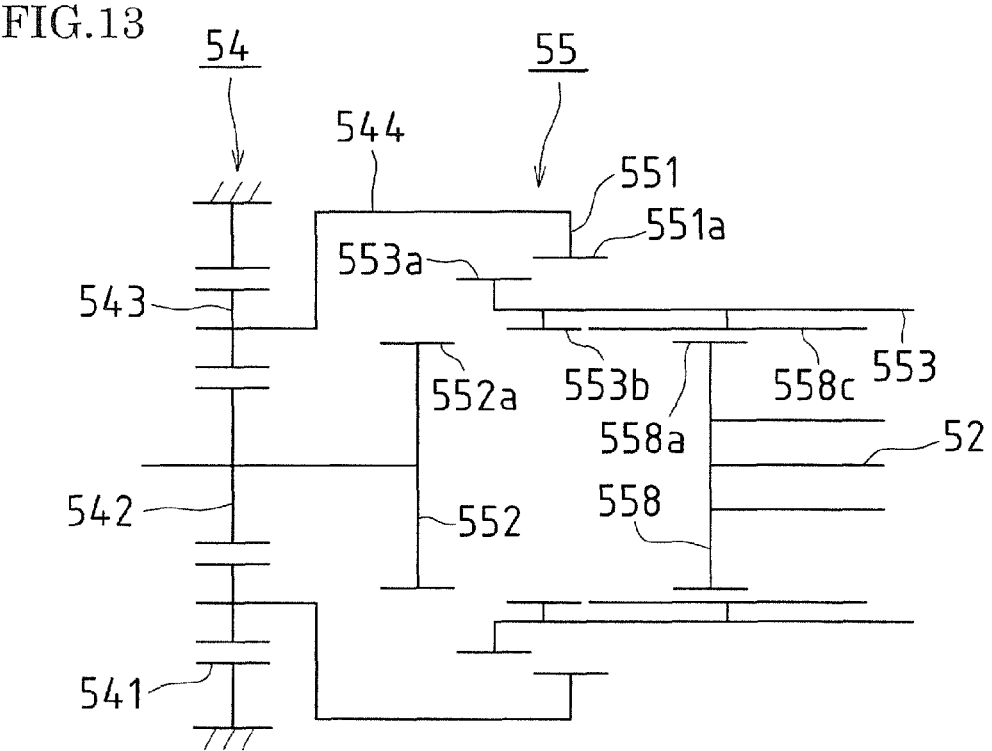
FIG. 13 is a diagram showing the sub-transmission mechanism and the range changing mechanism of FIG. 2, being in a neutral range.

As shown in FIG. 13, if the clutch sleeve 553 is at the neutral position where the clutch sleeve 553 is engaged with neither the low gear piece 551 nor the high gear piece 552, the rotational power input to the transfer input shaft 51 cannot be transferred to the rear output shaft 52. The above state is the neutral range (N).

Next, portions to which the present invention is applied will be described in detail with reference to FIGS. 14-16.

In response to a range change request during travel of the vehicle with the low range (L) or the high range (H) of the sub-transmission mechanism 54 of the transfer 5, the present invention is configured such that the range change can be smoothly and quickly completed without using a synchronous engaging mechanism.

That is, in this embodiment, when the range change is performed in the above-described state, the 4WD control computer 300 has a dominant role in performing the following kinds of processing: disengage processing to disengage the clutch sleeve 553 from the currently engaged gear piece 551 or 552 so as to establish the neutral range (N); rotation synchronization processing to eliminate the difference in the rotational speed between the target range gear piece 551 or 552 and the clutch sleeve 553 in the neutral range (N), or to make the difference in the rotational speed between the target range gear piece 551 or 552 and the clutch sleeve 553, in the neutral range (N), be equal to or less than the difference in which the clutch sleeve 553 can be engaged with the target range gear piece 551 or 552 by propulsive force that slides the clutch sleeve 553; and connection processing to slide the clutch sleeve 553 in a target direction by actuating the transfer shift actuator 60 so that the clutch sleeve 553 is connected to the connection target gear piece 551 or 552.

In the above-described disengage processing, torque transmission is temporarily stopped at the engaging portion of the clutch sleeve 553 with the currently connected gear piece 551 or 552, and thereby, engaging force of the engaging portion is temporarily reduced. Thus, the clutch sleeve 553 can be easily disengaged from the currently connected gear piece 551 or 552 with low friction. In this state, the clutch sleeve 553 is slid to the neutral range (N) side. In this way, the clutch sleeve 553 is smoothly disengaged from the currently connected gear piece 551 or 552.

Here, specific examples for temporarily reducing the engaging force will be given.

(Engine Traveling Mode) In a state in which the engine 1 singularly rotates the drive wheels 8F and 8R, the first motor generator MG1 is temporarily deactivated and the first brake B1 or the second brake B2 currently activated (engaged) in the main transmission mechanism 4 is temporarily deactivated (released) or in a slip state.

In this way, respective gears of the power splitter 3 become in an idle rotation state, and thereby the torque transmission from the crankshaft 11 of the engine 1 to the power transfer shaft 13 is shut off. Also, respective gears of the main transmission mechanism 4 become in an idle rotation state. Thus, the power transfer shaft 13, the carrier 46 of the second motor generator MG2 and the transfer input shaft 51 become in an idle rotation state.

Therefore, when, in the previous state, the vehicle was in a driving state in which torque was transmitted from the engine 1 to the drive wheels 8F and 8R, then the torque transmission from the currently connected gear piece 551 or 552 to the clutch sleeve 553 is shut out. On the other hand, when, in the previous state, the vehicle was in a driven state in which inertia torque was transmitted from the drive wheels 8F and 8R to the drive source (such as the engine 1, and the first motor generator MG 1), then drag torque of the drive source connected to the gear piece 551 or 552 is reduced, thereby the engaging force between the clutch sleeve 553 and the currently engaged gear piece 551 or 552 is reduced. For this reason, either the vehicle is in the driving state or in the driven state, the engaging force of the engaging portion of the clutch sleeve 553 with the currently engaged gear piece 551 or 552 is reduced.

(EV Traveling Mode) In a state in which the second motor generator MG2 singularly rotates the drive wheels 8F and 8R, the first brake B1 or the second brake B2 currently activated (engaged) in the main transmission mechanism 4 is deactivated (released) or in a slip state.

In this way, respective gears of the main transmission mechanism 4 become an idle rotation state, and thereby the power transfer shaft 13, the carrier 46 of the second motor generator MG2 and the transfer input shaft 51 become in an idle rotation state. In the above state, since the engine 1 and the first motor generator MG1 are deactivated, power transmission from the crankshaft 11 of the engine 1 to the power transfer shaft 13 and to the carrier 46 of the main transmission mechanism 4 is shut out.

Therefore, when, in the previous state, the vehicle was in a driving state in which torque was transmitted from the second motor generator MG2 to the drive wheels 8F and 8R, then the torque transmission from the currently connected gear piece 551 or 552 to the clutch sleeve 553 is shut out. On the other hand, when, in the previous state, the vehicle was in a driven state in which inertia torque was transmitted from the drive wheels 8F and 8R to the drive source (such as the engine 1, and the first motor generator MG 1), then drag torque of the drive source connected to the gear piece 551 or 552 is reduced, and thereby the engaging force between the clutch sleeve 553 and the currently engaged gear piece 551 or 552 is reduced. For this reason, either the vehicle is in the driving state or in the driven state, the engaging force of the engaging portion of the clutch sleeve 553 with the currently engaged gear piece 551 or 552 is reduced.

(Hybrid Traveling Mode) In a state in which the engine 1 and the second motor generator MG2 both rotate the drive wheels 8F and 8R, similarly to the above-described engine traveling mode, the first motor generator MG1 is temporarily deactivated and the first brake B1 or the second brake B2 currently activated (engaged) in the main transmission mechanism 4 is deactivated (released) or in a slip state.

In this way, respective gears of the power splitter 3 become in an idle rotation state, and thereby the torque transmission from the crankshaft 11 of the engine 1 to the power transfer shaft 13 is shut off. Also, respective gears of the main transmission mechanism 4 become in an idle rotation state. Thus, the power transfer shaft 13, the carrier 46 of the second motor generator MG2 and the transfer input shaft 51 become in an idle rotation state.

Therefore, when, in the previous state, the vehicle was in a driving state in which torque was transmitted from the engine 1 to the drive wheels 8F and 8R, then the torque transmission from the currently connected gear piece 551 or 552 to the clutch sleeve 553 is shut out. On the other hand, when, in the previous state, the vehicle was in a driven state in which inertia torque was transmitted from the drive wheels 8F and 8R to the drive source (such as the engine 1, and the first motor generator MG 1), then drag torque of the drive source connected to the gear piece 551 or 552 is reduced, and thereby the engaging force between the clutch sleeve 553 and the currently engaged gear piece 551 or 552 is reduced. For this reason, either the vehicle is in the driving state or in the driven state, the engaging force of the engaging portion of the clutch sleeve 553 with the currently engaged gear piece 551 or 552 is reduced.

Figure 14:
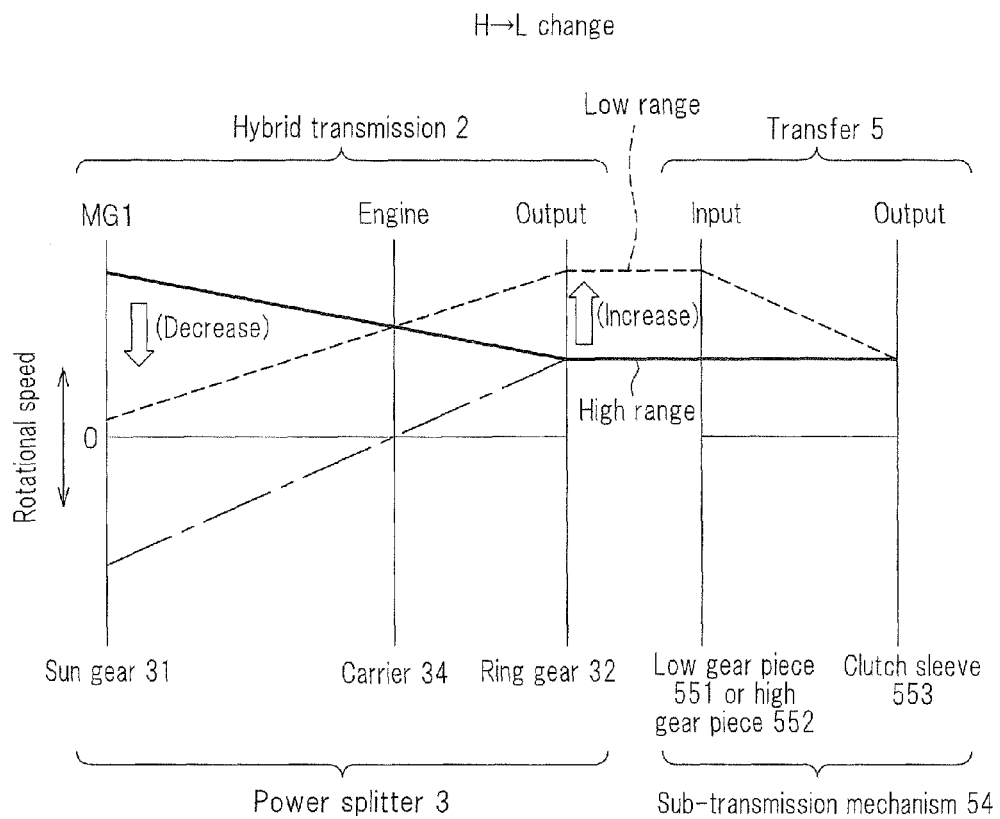
FIG. 14 is a nomogram with regard to the vehicle drive device of FIG. 1, which is used for explaining the range changing of the sub-transmission mechanism from the high range to the low range.

In the above-described rotation synchronization processing, when the range is changed from the high range (H) to the low range (L) as indicated by a solid line to a dashed line in FIG. 14, the rotational speed of the first motor generator MG1 is decreased and thereby the output rotational speed of the hybrid transmission 2, i.e. the input rotational speed of the transfer 5 (the rotational speed of the transfer input shaft 51 and of the connection target low gear piece 551) is increased so that the difference in the rotational speed between the connection target low gear piece 551 and the clutch sleeve 553 in the neutral range (N) is set to be zero, or be equal to or less than a predetermined value. On the other hand, when the range is changed from the low range (L) to the high range (H) as indicated by a solid line to a dashed line in FIG. 15, the rotational speed of the first motor generator MG1 is increased and thereby the output rotational speed of the hybrid transmission 2, i.e. the input rotational speed of the transfer 5 (the rotational speed of the transfer input shaft 51 and of the connection target high gear piece 552) is decreased so that the difference in the rotational speed between the connection target high gear piece 552 and the clutch sleeve 553 in the neutral range (N) is set to be zero, or be equal to or less than a predetermined value.

In the above-described rotation synchronization processing, when the difference in the rotational speed between the connection target gear piece 551 or 552 and the clutch sleeve 553 is not set to be zero but is set to be equal to or less than the predetermined value, even if respective rotational phases of the clutch sleeve 553 and the connection target gear piece 551 or 552 become identical during the connection processing later, they immediately shift each other, thus the teeth thereof do not collide each other.

Figure 15:
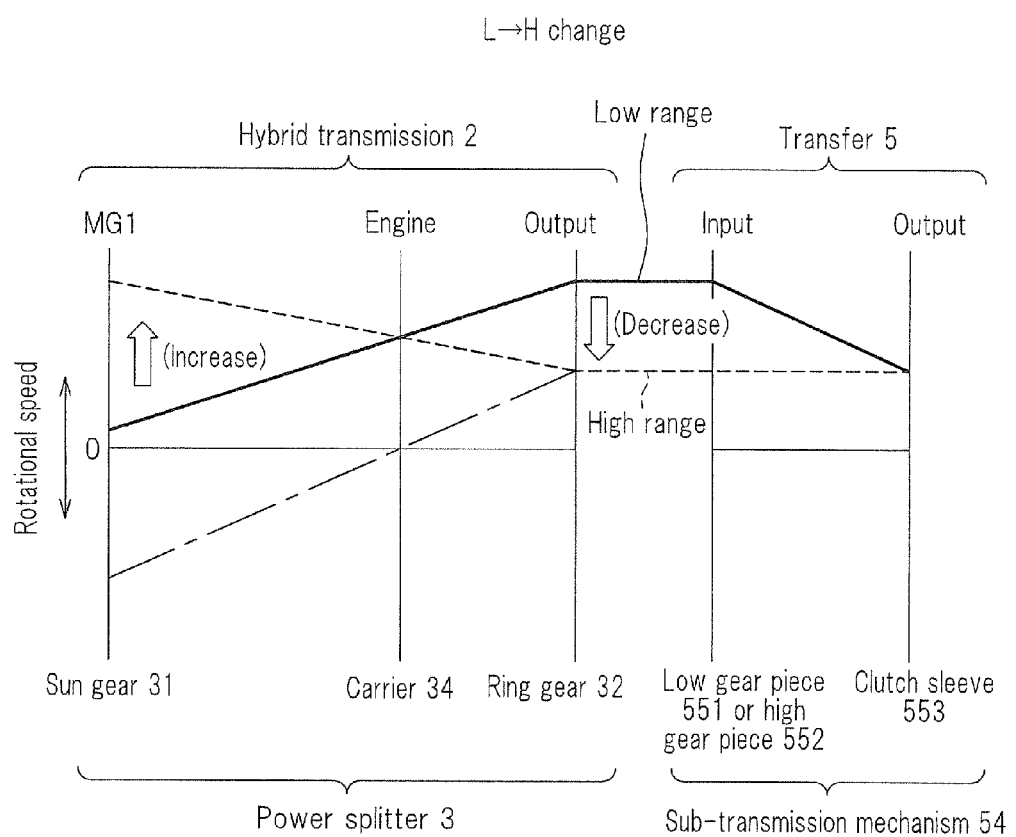
FIG. 15 is a nomogram with regard to the vehicle drive device of FIG. 1, which is used for explaining the range changing of the sub-transmission mechanism from the low range to the high range.
Figure 16:
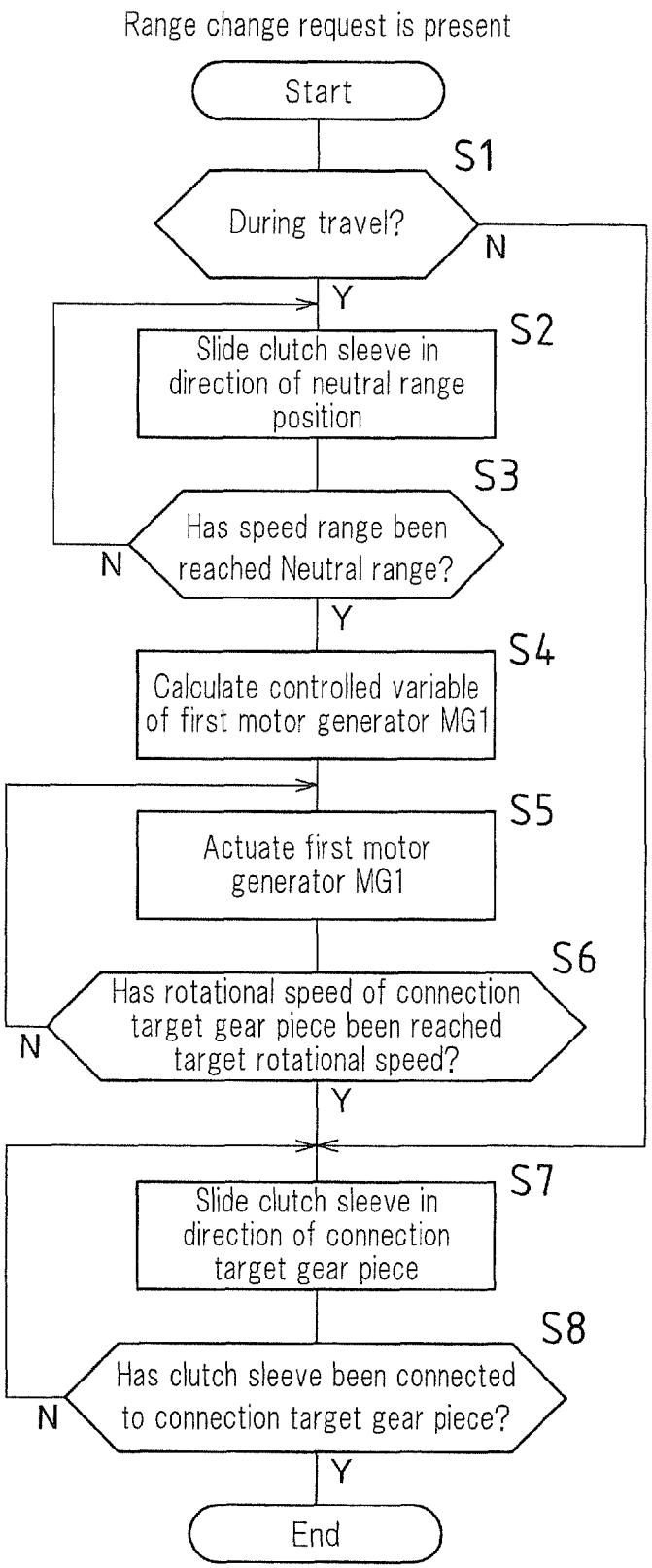
FIG. 16 is a flowchart for explaining range changing control of the sub-transmission mechanism of FIG. 1.

FIGS. 14 and 15 are nomograms with regard to the vehicle drive device. As shown in these nomograms, when reaction torque by the first motor generator MG1 is input to the sun gear 31 of the power splitter 3 relative to input torque to the carrier 34 of the power splitter 3 from the engine 1, torque after addition/subtraction of the above kinds of torque is generated in the ring gear 32 (output element) of the power splitter 3. Then, for example, when the rotational speed (output rotational speed) of the ring gear 32 is fixed, the rotational speed of the engine 1 can be continuously changed by changing the rotational speed of the first motor generator MG1. That is, the rotational speed of the engine 1 can be controlled by controlling the first motor generator MG1.

As indicated by respective dot-and-dash lines in the nomograms, when the vehicle is traveling while the engine 1 is being stopped, the first motor generator MG1 is reversely rotated. Thus, if the first motor generator MG1 is caused to act as an electrical motor to output torque in the positive rotation direction, the engine 1 can be started by being cranked via the carrier 34. In this case, on the power transfer shaft 13 and the transfer input shaft 51, which are connected to the carrier 34, is applied torque in a direction to stop the rotation. Therefore, drive torque to drive the vehicle can be maintained by controlling the output torque of the second motor generator MG2, and at the same time, the engine 1 can be smoothly started.

Specifically, an operation during changing of the range in this embodiment will be described with reference to the flowchart shown in FIG. 16. The flowchart of FIG. 16 shows kinds of processing in which the 4WD control computer 300 has a dominant role.

The processing of the flowchart is started when the 4WD control computer 300 receives the range change request. The range change request is performed by, for example, a driver selecting the low range (L) or the high range (H) using the speed range changing switch (not shown).

In step S1, it is determined whether or not the vehicle is during travel. Such a determination is performed by detecting whether or not the vehicle speed calculated according to output from a wheel speed sensor 301 is equal to or less than a predetermined threshold value. The threshold value is set to any value within a scope having a minimum value of zero and a maximum value of a vehicle speed capable of immediately being stopped (e.g. 5 km/h).

Here, when the vehicle is not traveling, i.e. during stop of the vehicle, a determination result in step S1 is negative, and steps S2-S6 are skipped to perform the processing in steps S7 and S8 as described later. Thus, the clutch sleeve 553 is slid by the transfer shift actuator 60 so as to be connected to the connection target gear piece 551 or 552, and the flowchart is terminated.

During stop of the vehicle, since the torque is not transmitted at the engaging portion of the clutch sleeve 553 with the currently engaged gear piece 551 or 552, the engaging portion can be relatively easily disengaged, or also the clutch sleeve 553 can be relatively easily engaged with the connection target gear piece 551 or 552.

On the other hand, during travel of the vehicle, a determination result in step S1 is positive, and the processing in steps S2 and S3 is performed. Thus, the currently established low range (L) or the high range (H) is set to be the neutral range (N).

Specifically, in step S2, torque transmission is temporarily stopped at the engaging portion of the clutch sleeve 553 with the currently connected gear piece 551 or 552, then the transfer shift actuator 60 is actuated to slide the clutch sleeve 553 in the direction to be disengaged from the currently engaged gear piece 551 or 552, i.e. the neutral range (N) side. Note that the temporary stop processing of the torque transmission in step S2 is performed, as described above, according to the respective traveling modes (i.e. the engine traveling mode, the EV traveling mode and the hybrid traveling mode). In performing the temporary stop processing of the torque transmission, the 4WD control computer 300 sends, to the power management control computer 200, a control instruction for controlling the first motor generator MG1 in order to control operations of the first motor generator MG1.

In the following step S3, it is determined whether or not the clutch sleeve 553 reaches the neutral range (N). The determination here is performed, as described above, based on a determination logic (see FIG. 10) by the combinations of "on" and "off" of the three contact points HL1-HL3 of the limit switch 64. Then, when the clutch sleeve 553 reaches the neutral range (N), a determination result in step S3 becomes positive to proceeds to the following step S4.

In step S4, a controlled variable (target rotational speed) of the first motor generator MG1 is calculated. Such a controlled variable is needed so that the difference between the rotational speed of the connection target gear piece 551 or 552 (input rotational speed of the sub-transmission mechanism 54) and the rotational speed of the clutch sleeve 553 (output rotational speed of the sub-transmission mechanism 54) in the neutral range (N) is set to be zero, or be equal to or less than the predetermined value.

Specifically, the difference in the rotational speed between the connection target gear piece 551 or 552 and the clutch sleeve 553 is calculated. Then, a target input rotational speed to the transfer input shaft 51 is determined, which is needed so that the calculation result is zero, or is equal to or less than the predetermined value. Based on the target input rotational speed, a target rotational speed of the connection target gear piece 551 or 552 is calculated. Then, the controlled variable (target rotational speed) of the first motor generator MG1, which is needed to establish the above target rotational speed for the connection target gear piece 551 or 552, is calculated.

The rotational speed of the connection target gear piece 551 or 552 can be calculated based on the output from an input rotational speed sensor 302 that detects an actual rotational speed of the transfer input shaft 51. Such an actual rotational speed is the same as the rotational speed of the power transfer shaft 13 that is the output shaft of the hybrid transmission 2. Also, the rotational speed of the clutch sleeve 553 can be calculated based on the output of the wheel speed sensor 301.

After that, in steps S5 and S6, the difference in the rotational speed between the connection target gear piece 551 or 552 and the clutch sleeve 553 is set to be zero, or be equal to or less than the predetermined value.

Specifically, in step S5, the 4WD control computer 300 sends, to the power management control computer 200, the control instruction for controlling the first motor generator MG1 in order to control the operations of the first motor generator MG1. Thus, the rotational speed of the connection target gear piece 551 or 552 is controlled. Then, in step S6, it is determined whether or not the actual rotational speed of the connection target gear piece 551 or 552 reaches the target rotational speed based on the output from the input rotational speed sensor 302.

That is, the above-described steps S5 and S6 are repeated until the actual rotational speed of the connection target gear piece 551 or 552 reaches the target rotational speed. Once reached, a determination result in step S6 becomes positive to proceeds to the following step S7.

In step S7, the transfer shift actuator 60 is actuated to slide the clutch sleeve 553 in the direction of the connection target gear piece 551 or 552. Then, in the following step S8, it is determined whether or not the clutch sleeve 553 is connected to the connection target gear piece 551 or 552, i.e. whether or not the range has been changed to the target range. The determination in step S8 is performed, as described above, based on the determination logic (see FIG. 10) by the combinations of "on" and "off" of the three contact points HL1-HL3 of the limit switch 64.

In this way, the above-described steps S7 and S8 are repeated until the clutch sleeve 553 is connected to the connection target gear piece (551 or 552). Once connected, a determination result in step S8 becomes positive to terminate the flowchart.

During travel of the vehicle as described above, in order to change the range to the neutral range (N) in response to the range change request from the high range (H) to the low range (L), the currently engaged first brake B1 or second brake B2 is temporarily released or slipped. Thus, it is possible to reduce the engaging force between the inner teeth 553b of the clutch sleeve 553 and the outer teeth 552a of the high gear piece 552. In this state, the clutch sleeve 553 is rapidly slid to the neutral range (N) side using the transfer shift actuator 60, and thereby the clutch sleeve 553 can be disengaged from the currently connected high gear piece 552 with low friction. Thus, the neutral range (N) can be relatively easily established. After that, as shown in FIG. 14, the rotational speed of the first motor generator MG1 is decreased and the rotational speed of the transfer input shaft 51 is increased, thus, the difference in the rotational speed between the connection target low gear piece 551 and the clutch sleeve 553 is set to be zero, or be equal to or less than the predetermined value. In such a state in which the rotations are synchronized, the clutch sleeve 553 is slid in the direction of the connection target low gear piece 551 by the transfer shift actuator 60. Accordingly, the clutch sleeve 553 can be relatively easily engaged with and connected to the connection target low gear piece 551.

On the other hand, during travel of the vehicle as described above, in order to change the range to the neutral range (N) in response to the range change request from the low range (L) to the high range (H), the currently engaged first brake B1 or second brake B2 is temporarily released or slipped. Thus, it is possible to reduce the engaging force between the outer teeth 553a of the clutch sleeve 553 and the inner teeth 551a of the low gear piece 551. In this state, the clutch sleeve 553 is rapidly slid to the neutral range (N) side using the transfer shift actuator 60, and thereby the clutch sleeve 553 can be disengaged from the currently connected low gear piece 551 with low friction. Thus, the neutral range (N) can be relatively easily established. After that, as shown in FIG. 15, the rotational speed of the first motor generator MG1 is increased and the rotational speed of the transfer input shaft 51 is decreased, thus, the difference in the rotational speed between the connection target high gear piece 552 and the clutch sleeve 553 is set to be zero, or be equal to or less than the predetermined value. In such a state in which the rotations are synchronized, the clutch sleeve 553 is slid in the direction of the connection target high gear piece 552 by the transfer shift actuator 60. Accordingly, the clutch sleeve 553 can be relatively easily engaged with and connected to the connection target high gear piece 552.

Here, a corresponding relationship between the components of the vehicle drive device of the above embodiment and the components recited in claim 1 will be described. The sub-transmission mechanism 54 of the transfer 5 corresponds to a transmission mechanism recited in claim 1. The range changing mechanism 55 corresponds to a range changing mechanism recited in claim 1. The first motor generator MG1 corresponds to a motor generator recited in claim 1. The 4WD control computer 300 and the power management control computer 200 correspond to a control device recited in claim 1. Note that if the 4WD control computer 300 and the power management control computer 200 are implemented as a single computer, this single computer corresponds to the control device recited in claim 1. A disengage processor recited in claim 1 corresponds to steps S2 and S3 of FIG. 16. A rotation synchronization processor recited in claim 1 corresponds to steps S4-S6 of FIG. 16. A connection processor recited in claim 1 corresponds to steps S7 and S8 of FIG. 16.

As described above, the embodiment to which the present invention is applied includes: the disengage processor that disengages the clutch sleeve 553 from the currently engaged gear piece 551 or 552 so as to establish the neutral range (N) in response to the range change request during the travel of the sub-transmission mechanism 54 of the transfer 5 in the low range (L) or in the high range (H); the rotation synchronization processor that synchronizes the input rotational speed of the sub-transmission mechanism 54 with the output rotational speed thereof using the first motor generator MG1 in the neutral range (N); and a connection processor that slides, after such a synchronization, the clutch sleeve 553 to be connected to the connection target gear piece 551 or 552.

In the disengaging processor, the clutch sleeve 553 can be disengaged from the currently engaged gear piece 551 or 552 with low friction by reducing the engaging force of the engaging portion of the clutch sleeve 553 with the currently engaged gear piece 551 or 552. Accordingly, it is possible to perform processing easily and smoothly to establish the neutral range (N).

Furthermore, in the rotation synchronization processor, the input rotational speed of the sub-transmission mechanism 54 (the rotational speed of the connection target gear piece 551 or 552) is synchronized with the output rotational speed of the sub-transmission mechanism 54 (the rotational speed of the clutch sleeve 553) by controlling the first motor generator MG1 in the neutral range (N). Accordingly, in the connection processor, it is possible to connect easily and smoothly the clutch sleeve 553 to the connection target gear piece 551 or 552.

Therefore, during travel of the vehicle, it is possible that the range change of the sub-transmission mechanism 54 is completed smoothly and quickly, which has been impossible in the conventional art. Among others, in the present invention, the existing first motor generator MG1 is efficiently used, accordingly, it is not necessary to equip with a synchronous engaging mechanism in the range changing mechanism 55, in contrast to the conventional art. Thus, it is possible to eliminate increase of the equipment cost. Therefore, with the present invention, it is possible to provide, at a comparatively low cost, a convenient and reliable vehicle drive device capable of changing the range.

Note that the present invention is not intended to be limited to the above embodiment. It will be obvious that various changes and modifications may be made without departing the scope of the present invention.

In the above embodiment, the vehicle drive device includes the two motor generators MG1 and MG2. However, the present invention should not be limited thereto. The present invention may be applied to a vehicle drive device that includes a single motor generator or a vehicle drive device that does not include the engine 1 and includes only a motor generator as a drive source.

Industrial Applicability

The present invention is suitable for use in a vehicle drive device that includes a transmission mechanism that selectively establishes one of a low range and a high range and that power-transmissively connects an output shaft to drive wheels, a range changing mechanism that changes the range of the transmission mechanism, a motor generator that inputs drive force to the transmission mechanism, and a control device that controls the changing of the range.

DESCRIPTION OF REFERENCE NUMERALS

1 Engine
2 Hybrid transmission
3 Power splitter
4 Main transmission mechanism
5 Transfer
51 Transfer input shaft
52 Rear output shaft
53 Front output shaft
54 Sub-transmission mechanism
545 Transfer case
55 Range changing mechanism
551 Low gear piece
551a Inner teeth of low gear piece
552 High gear piece
552a Outer teeth of high gear piece
553 Clutch sleeve
553a Outer teeth of clutch sleeve
553b Inner teeth of clutch sleeve
554 Shift fork
558 Hub sleeve
56 Mode changing mechanism
60 Transfer shift actuator
61 Shift fork shaft
62 Shift motor
63 Power transfer mechanism
64 Limit switch
100 Engine control computer
200 Hybrid control computer
300 4WD control computer
301 Wheel speed sensor
302 Input rotational speed sensor

The invention claimed is:

1. A vehicle drive device including a transmission mechanism selectively establishing one of a low range and a high range and power-transmissively connecting an output shaft to drive wheels, a range changing mechanism changing the range of the transmission mechanism, a motor generator inputting drive force to the transmission mechanism, and a control device controlling the changing of the range,
wherein the range changing mechanism includes:
a low gear piece and a high gear piece that are arranged and spaced apart from each other in an axial direction;
a clutch sleeve that is slidably arranged in the axial direction so as to be engaged with one of the two gear pieces and that is integrally rotatably connected to the output shaft of the transmission mechanism; and
a shift actuator that slides the clutch sleeve either forward or backward in the axial direction to be connected to one of the gear pieces,
and when the clutch sleeve is connected to the low gear piece, a low-range power transfer path is established, and when the clutch sleeve is connected to the high gear piece, a high-range power transfer path is established,
wherein the control device includes:
- a disengage processor that disengages the clutch sleeve from the currently engaged gear piece so as to establish a neutral range in response to a range change request in a state in which the drive wheels are rotated in the low range or in the high range;
- a rotation synchronization processor that controls an output rotational speed of the motor generator in the neutral range such that a difference between an input rotational speed and an output rotational speed of the transmission mechanism is set to be zero or be equal to or less than a predetermined value; and
- a connection processor that slides the clutch sleeve to be connected to a connection target gear piece.

2. The vehicle drive device according to claim 1,
wherein the disengage processor temporarily reduces engaging force between the clutch sleeve and the currently engaged gear piece, then slides the clutch sleeve to a neutral range side.

3. The vehicle drive device according to claim 2, further comprising a main transmission mechanism provided between the motor generator and an input shaft of the transmission mechanism,
wherein the main transmission mechanism is configured to have, as a main component, a Ravigneaux planetary gear set that includes a front sun gear that is supported by a case via a first friction engaging element, a rear sun gear that is connected to a rotor of the motor generator, a ring gear that is supported by the case via a second friction engaging element, a plurality of long pinion gears that is engaged with the ring gear and the rear sun gear, a plurality of short pinion gears that is engaged with the long pinion gears, and a carrier that is connected to the input shaft of the transmission mechanism so as to rotatably support the short pinion gears and the long pinion gears and that is rotated in synchronization with an orbital motion of the short pinion gears and the long pinion gears,
wherein the main transmission mechanism is a high and low two-stage reduction mechanism that changes a gear ratio between the low range and the high range by engaging or disengaging the first friction engaging element and the second friction engaging element, and
wherein the disengaging processor temporarily releases or slips the currently engaged friction engaging element between the two friction engaging elements in order to temporarily reduce the engaging force.

4. The vehicle drive device according to claim 1,
wherein the shift actuator includes a shift fork shaft for sliding the clutch sleeve, a shift motor that generates rotational power, a power transfer mechanism that moves the shift fork shaft in an axial direction thereof using the rotational power generated by the shift motor, a low range detection element that outputs low range establishment information when a rotation angle of an output shaft of the shift motor reaches an angle at which the clutch sleeve is completely connected to the low gear piece, a high range detection element that outputs high range establishment information when a rotation angle of the output shaft of the shift motor reaches an angle at which the clutch sleeve is completely connected to the high gear piece, and
wherein the control device further includes a determination processor that determines whether or not the clutch sleeve, which has been slid by the connection processor, is connected to the connection target gear piece based on the output information from the respective detection elements.

5. The vehicle drive device according to claim 1,
wherein the transmission mechanism is configured as a planetary gear set including a sun gear that receives input rotation, a ring gear that is non-rotatably disposed, a plurality of pinion gears that is disposed between the sun gear and the ring gear so as to be engaged with both of the sun gear and the ring gear, and a carrier that rotatably supports the pinion gears and is rotated in synchronization with an orbital motion of the pinion gears, and
wherein the carrier is integrally rotatable with the low gear piece, and the sun gear is integrally rotatable with the high gear piece.

6. The vehicle drive device according to claim 1,
wherein the low gear piece is a gear with inner teeth, and the high gear piece is a gear with outer teeth and disposed inside the low gear piece without making contact with the low gear piece, and
wherein the clutch sleeve includes outer teeth capable of being engaged with the inner teeth of the low gear piece and inner teeth capable of being engaged with the outer teeth of the high gear piece.

7. The vehicle drive device according to claim 1, further comprising a second motor generator and a main transmission mechanism both provided between the motor generator and an input shaft of the transmission mechanism, and an engine provided via a power splitter that is disposed between the second motor generator and the motor generator.

* * * * *